(12) United States Patent
    Bonnat

(10) Patent No.: US 9,753,533 B2
(45) Date of Patent: Sep. 5, 2017

(54) METHOD AND SYSTEM FOR CONTROLLING A USER INTERFACE OF A DEVICE USING HUMAN BREATH

(76) Inventor: Pierre Bonnat, Las Vegas, NV (US)

( * ) Notice: Subject to any disclaimer, the term of this patent is extended or adjusted under 35 U.S.C. 154(b) by 887 days.

(21) Appl. No.: 12/880,892

(22) Filed: Sep. 13, 2010

(65) Prior Publication Data

US 2011/0004327 A1    Jan. 6, 2011

Related U.S. Application Data

(63) Continuation-in-part of application No. 12/813,292, filed on Jun. 10, 2010, which is a continuation of application No. 12/056,164, filed on Mar. 26, 2008, now Pat. No. 7,739,061.

(60) Provisional application No. 61/241,376, filed on Sep. 11, 2009, provisional application No. 61/242,201, filed on Sep. 14, 2009.

(51) Int. Cl.
    *G01F 1/00*       (2006.01)
    *G06F 3/01*       (2006.01)
    *G06F 3/0346*     (2013.01)
    *G06F 3/0481*     (2013.01)
    *G06F 3/0485*     (2013.01)

(52) U.S. Cl.
    CPC .......... *G06F 3/011* (2013.01); *G06F 3/0346* (2013.01); *G06F 3/0481* (2013.01); *G06F 3/0485* (2013.01); *G06F 2203/04806* (2013.01); *G10H 2220/361* (2013.01)

(58) Field of Classification Search
    CPC ...... G06F 3/011; G06F 3/0346; G06F 3/0485; G06F 3/0481

USPC ......................................................... 702/48
See application file for complete search history.

(56) References Cited

U.S. PATENT DOCUMENTS

| | | | |
|---|---|---|---|
| 4,521,772 A | 6/1985 | Lyon |
| 5,740,801 A | 4/1998 | Branson |
| 5,835,077 A | 11/1998 | Dao |
| 5,889,511 A | 3/1999 | Ong |
| 6,040,821 A | 3/2000 | Franz |

(Continued)

FOREIGN PATENT DOCUMENTS

| | | | |
|---|---|---|---|
| CN | 1346566 A | 4/2002 |
| CN | 101061455 A | 10/2007 |
| WO | 0046969 A1 | 8/2000 |

OTHER PUBLICATIONS

European Patent Office, International Search Report, in PCT/US03/32203, dated Aug. 24, 2005.

(Continued)

*Primary Examiner* — Toan Le
*Assistant Examiner* — Xiuquin Sun
(74) *Attorney, Agent, or Firm* — McAndrews, Held & Malloy, Ltd.

(57) ABSTRACT

Certain aspects of a method and system for controlling a user interface of a device using human breath may include a device having an embedded micro-electro-mechanical system (MEMS) sensing and processing module. The MEMS sensing and processing module may detect movement caused by expulsion of human breath by a user. In response to the detection of movement caused by expulsion of human breath, one or more control signals may be generated. The generated control signals may control the user interface of the device and may enable navigation and/or selection of components in the user interface.

34 Claims, 27 Drawing Sheets

(56) References Cited

U.S. PATENT DOCUMENTS

| | | | |
|---|---|---|---|
| 6,064,964 A * | 5/2000 | Yamamoto et al. | 704/270 |
| 6,213,955 B1 | 4/2001 | Karakasoglu et al. | |
| 6,323,846 B1 | 11/2001 | Westerman | |
| 6,396,416 B1 * | 5/2002 | Kuusela et al. | 340/870.28 |
| 6,421,617 B2 | 7/2002 | Felsenstein | |
| 6,459,424 B1 * | 10/2002 | Resman | 345/173 |
| 6,574,571 B1 | 6/2003 | Bonat | |
| 6,801,231 B1 * | 10/2004 | Beltz | 715/865 |
| 7,587,277 B1 | 9/2009 | Wells | |
| 2006/0140422 A1 | 6/2006 | Zurek et al. | |
| 2008/0163379 A1 * | 7/2008 | Robinson et al. | 726/27 |
| 2008/0177404 A1 | 7/2008 | Bonnat | |
| 2009/0082884 A1 | 3/2009 | Bonnat | |

OTHER PUBLICATIONS

European Patent Office, Preliminary Examination Report, in PCT/US03/32203, dated Mar. 29, 2006.

United States Patent and Trademark Office, Office Action, in U.S. Appl. No. 10/530,946, dated Oct. 5, 2007.

Patent Cooperation Treaty, Notification of Transmittal of International Search Report and the Written Opinion of the International Searching Authority, or the Declaration, in PCT/US2010/048646, dated Nov. 3, 2010.

Chinese patent application No. 201080051123.8 office action dated Jan. 6, 2014.

McGraw-Hill Dictionary of Scientific and Technical Terms—Sixth Edition, © 2003, The McGraw-Hill Companies, Inc. (4 pages).

\* cited by examiner

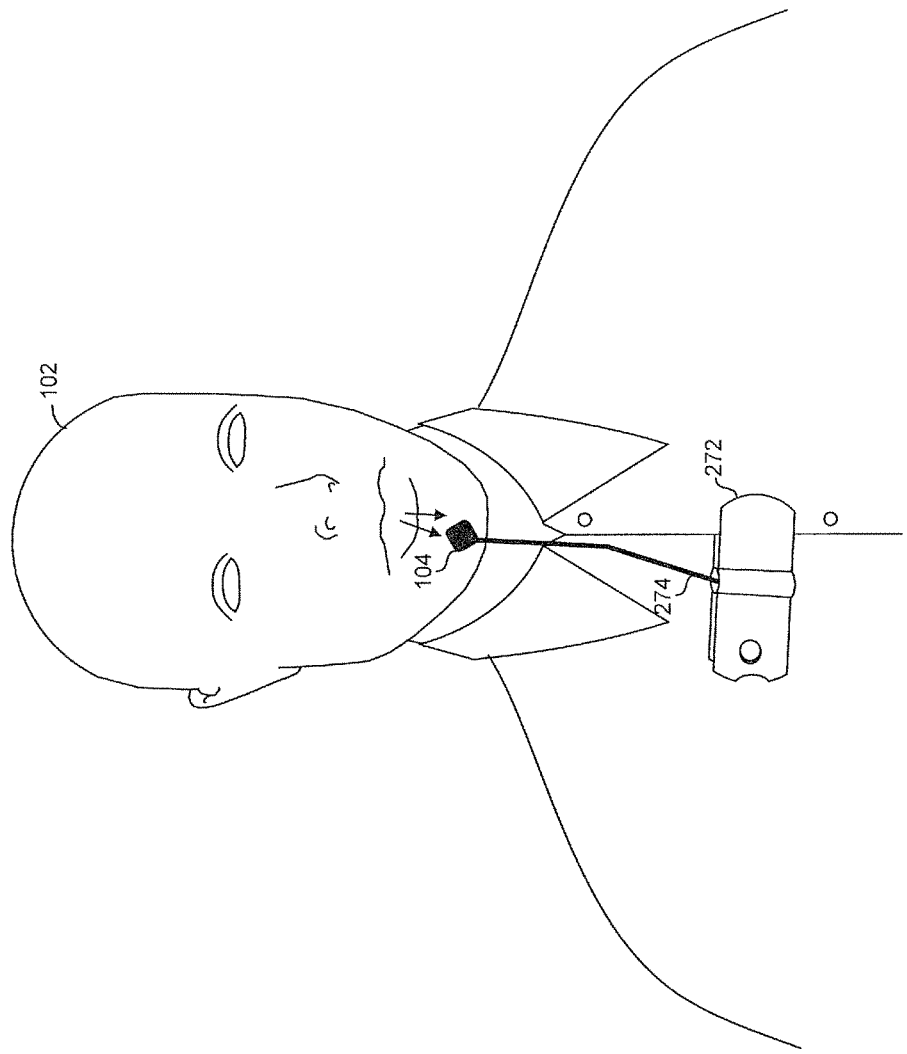

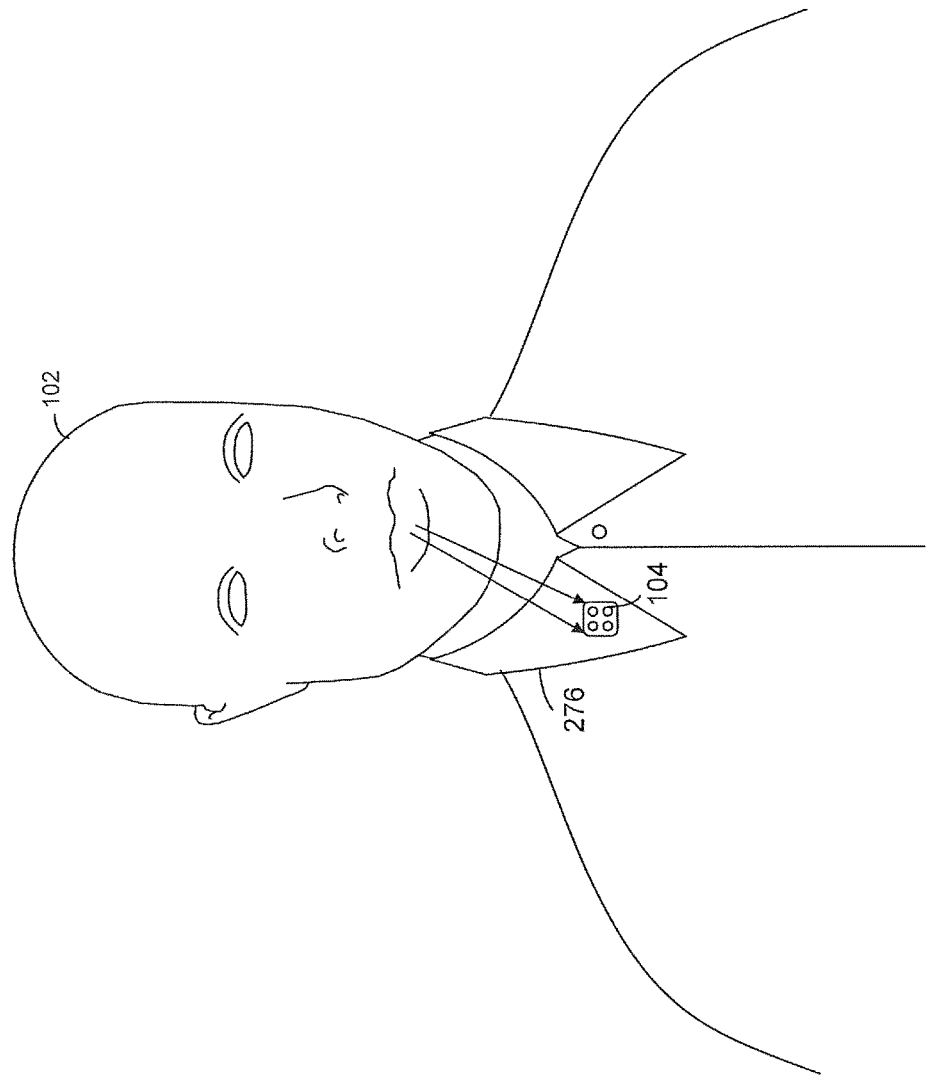

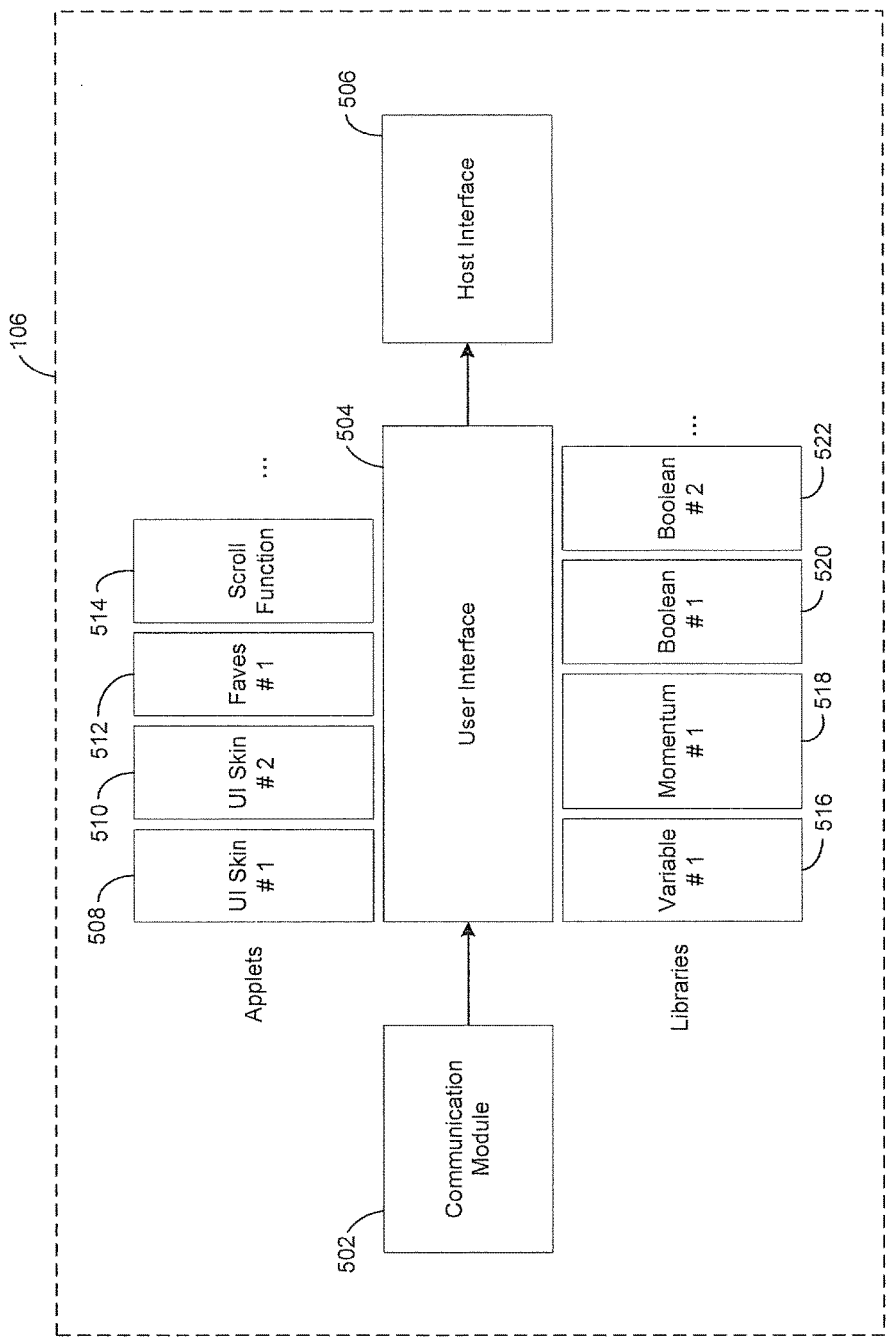

METHOD AND SYSTEM FOR CONTROLLING A USER INTERFACE OF A DEVICE USING HUMAN BREATH

CROSS-REFERENCE TO RELATED APPLICATIONS/INCORPORATION BY REFERENCE

This application is a continuation-in-part of U.S. patent application Ser. No. 12/813,292, filed Jun. 10, 2010, which is a continuation of U.S. patent application Ser. No. 12/056,164, filed Mar. 26, 2008, now U.S. Pat. No. 7,739,061.

This application makes reference to, claims priority to, and claims benefit of U.S. Provisional Application Ser. No. 61/241,376, filed Sep. 11, 2009 and U.S. Provisional Application Ser. No. 61/242,201, filed Sep. 14, 2009.

This application also makes reference to:
U.S. application Ser. No. 12/055,999, filed Mar. 26, 2008;
U.S. application Ser. No. 12/056,203, filed Mar. 26, 2008
U.S. application Ser. No. 12/056,171, filed Mar. 26, 2008;
U.S. application Ser. No. 12/056,061, filed Mar. 26, 2008; and
U.S. application Ser. No. 12/056,187, filed Mar. 26, 2008.

Each of the above referenced applications is hereby incorporated herein by reference in its entirety.

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the invention relate to controlling a computer or electronic system. More specifically, certain embodiments of the invention relate to a method and system for controlling a user interface of a device using human breath.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology.

While voice connections fulfill the basic need to communicate, and mobile voice connections continue to filter even further into the fabric of every day life, the mobile access to services via the Internet has become the next step in the mobile communication revolution. Currently, most mobile devices are equipped with a user interface that allows users to access the services provided via the Internet. For example, some mobile devices may have browsers, and software and/or hardware buttons may be provided to enable navigation and/or control of the user interface. Some mobile devices such as Smartphones are equipped with touch screen capability that allows users to navigate or control the user interface via touching with one hand while the device is held in another hand.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for controlling a user interface of a device using human breath, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2I is a diagram illustrating an exemplary MEMS sensing and processing module located on a clip, in accordance with an embodiment of the invention.

FIG. 2J is a diagram illustrating an exemplary MEMS sensing and processing module embedded in a fabric, in accordance with an embodiment of the invention.

FIG. 5 is a block diagram of an exemplary user interface interacting with a MEMS sensing and processing module and a host system, in accordance with an embodiment of the invention.

DETAILED DESCRIPTION OF THE INVENTION

Certain aspects of the invention may be found in a method and system for controlling a user interface of a device using human breath. Exemplary aspects of the invention may comprise a device comprising an embedded micro-electro-mechanical system (MEMS) sensing and processing module. The MEMS sensing and processing module may detect movement caused by expulsion of human breath by a user. In response to the detection of movement caused by expulsion of human breath, one or more control signals may be generated. The generated control signals may be utilized to control the user interface of a device and may enable navigation and/or selection of components in the user interface. The generated one or more control signals may be communicated to the device being controlled via one or more of an external memory interface, a universal asynchronous receiver transmitter (UART) interface, an enhanced serial peripheral interface (eSPI), a general purpose input/output (GPIO) interface, a pulse-code modulation (PCM) and/or an inter-IC sound ($I^2S$) interface, an inter-integrated circuit ($I^2C$) bus interface, a universal serial bus (USB) interface, a Bluetooth interface, a ZigBee interface, an IrDA interface, and/or a wireless USB (W-USB) interface. The expulsion of the human breath may occur in open space and the detection of the movement caused by the expulsion may occur without the use of a channel. One exemplary embodiment of a user interface is a graphical user interface (GUI).

Figure 1A:
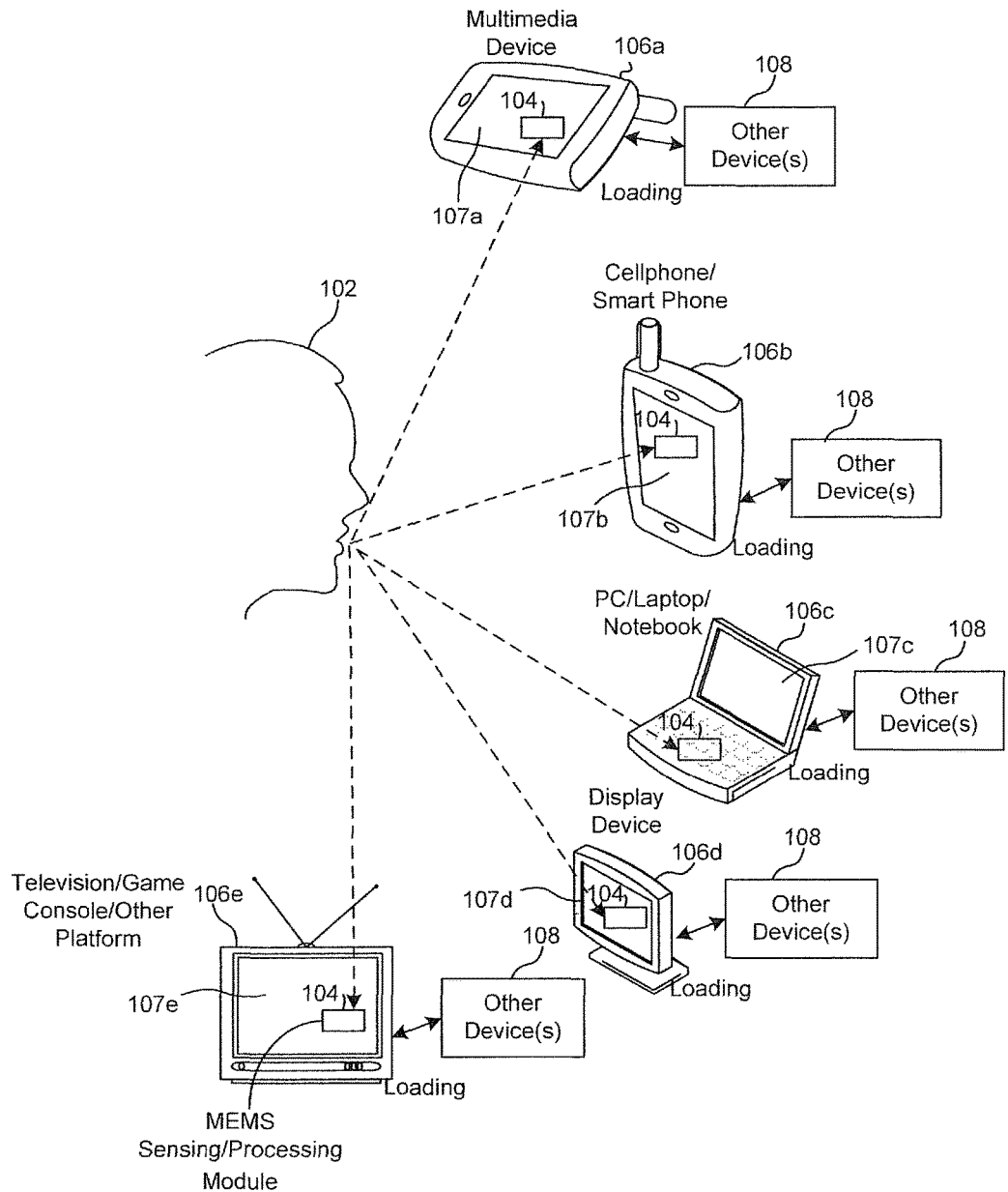
FIG. 1A is a block diagram of an exemplary system for controlling a user interface of a plurality of devices using human breath, in accordance with an embodiment of the invention.

FIG. 1A is a block diagram of an exemplary system for controlling a user interface of a plurality of devices using human breath, in accordance with an embodiment of the invention. Referring to FIG. 1A, there is shown a user 102, and a plurality of devices to be controlled, such as a multimedia device 106a, a cellphone/smartphone/dataphone 106b, a personal computer (PC), laptop or a notebook computer 106c, a display device 106d and/or a television (TV)/game console/other platform 106e. Each of the plurality of devices to be controlled, such as a multimedia device 106a, a cellphone/smartphone/dataphone 106b, a personal computer (PC), laptop or a notebook computer 106c, a display device 106d and/or a television (TV)/game console/other platform 106e may comprise an embedded micro-electro-mechanical system (MEMS) sensing and processing module 104.

The multimedia device 106a may comprise a user interface 107a, the cellphone/smartphone/dataphone 106b may comprise a user interface 107b, and the personal computer (PC), laptop or a notebook computer 106c may comprise a user interface 107c. Additionally, the display device 106d may comprise a user interface 107d and the television (TV)/game console/other platform 106e may comprise a user interface 107e. Each of the plurality of devices to be controlled may be wired or wirelessly connected to a plurality of other devices 108 for loading of information via, for example, side loading, or loading via a peer-to-peer connection, and/or a network connection, and by wired and/or wireless communication. Exemplary other devices 108 may comprise game consoles, immersive or 3D reality devices, and/or telematic devices. Telematic devices refers to devices comprising integrated computing, wireless communication and/or global navigation satellite system devices, which enables sending, receiving and/or storing of information over networks. The user interface may enable interacting with the device being controlled by one or more inputs, for example, expulsion of a fluid such as air, tactual inputs such as button presses, audio inputs such as voice commands, and/or movements of the electronic device 202 such as those detected by an accelerometer and/or gyroscope.

The MEMS sensing and processing module 104 may comprise suitable logic, circuitry, interfaces, and/or code that may be operable to detect movement caused by expulsion of human breath by the user 102. In response to the detection of movement caused by expulsion of human breath, the MEMS sensing and processing module 104 may be operable to generate one or more controls signals. The MEMS sensing and processing module 104 may comprise one or more segments or members that may be operable to sense the kinetic energy generated by the expulsion of the human breath and accordingly generate the one or more control signals. The generated one or more control signals may be operable to control a user interface of one or more of a plurality of devices, such as the user interface 107a of the multimedia device 106*a*, the user interface 107*b* of the cellphone/smartphone/dataphone 106*b*, the user interface 107*c* of the PC, laptop or a notebook computer 106*c*, the user interface 107*d* of the display device 106*d*, the user interface 107*e* of the TV/game console/other platform 106*e*, and the user interfaces of the mobile multimedia player and/or a remote controller. One exemplary embodiment of a user interface is a graphical user interface (GUI). Any information and/or data presented on a display including programs and/or applications may be part of the user interface. U.S. application Ser. No. 12/055,999, filed on Mar. 26, 2008 discloses an exemplary MEMS sensing and processing module and is hereby incorporated herein by reference in its entirety.

In accordance with an embodiment of the invention, the detection of the movement caused by expulsion of human breath may occur without use of a channel. The detection of the movement caused by expulsion of human breath may be responsive to the expulsion of human breath into open space, which is then sensed.

In accordance with another embodiment of the invention, the MEMS sensing and processing module 104 may be operable to navigate within the user interface of one or more of the plurality of devices, such as a handheld device, for example, a multimedia device 106*a*, a cellphone/smartphone/dataphone 106*b*, a PC, laptop or a notebook computer 106*c*, a display device 106*d*, and/or a TV/game console/other platform 106*e* via the generated one or more control signals. The MEMS sensing and processing module 104 may be operable to select one or more components within the user interface of the plurality of devices via the generated one or more control signals. The generated one or more control signals may comprise one or more of a wired and/or a wireless signal.

In accordance with another embodiment of the invention, one or more of the plurality of devices, such as a handheld device, for example, a multimedia device 106*a* and/or a cellphone/smartphone/dataphone 106*b* and/or a PC, laptop or a notebook computer 106*c* may be operable to receive one or more inputs defining the user interface from another device 108. The other device 108 may be one or more of a PC, laptop or a notebook computer 106*c* and/or a handheld device, for example, a multimedia device 106*a* and/or a cell phone/smartphone/dataphone 106*b*. In this regard, data may be transferred from the other device 108 to the cellphone/smartphone/dataphone 106*b* and this data may be associated or mapped to media content that may be remotely accessed by the cellphone/smartphone/dataphone 106*b* via a service provider such as a cellular or PCS service provider. The transferred data that is associated or mapped to media content may be utilized to customize the user interface 107*b* of the cellphone/smartphone/dataphone 106*b*. In this regard, media content associated with one or more received inputs may become an integral part of the user interface of the device being controlled. The associating and/or mapping may be performed on either the other device 108 and/or one the cellphone/smartphone/dataphone 106*b*. In instances where the associating and/or mapping is performed on the other device 108, the associated and/or mapped data may be transferred from the other device 108 to the cellphone/smartphone/dataphone 106*b*.

In an exemplary embodiment of the invention, an icon transferred from the other device 108 to the cellphone/smartphone/dataphone 106*b* may be associated or mapped to media content such as an RSS feed, a markup language such as HTML, and XML, that may be remotely accessed by the cellphone/smartphone/dataphone 106*b* via the service provider of the cellphone/smartphone 106*b*. Accordingly, when the user 102 blows on the MEMS sensing and processing module 104, control signals generated by the MEMS sensing and processing module 104 may navigate to the icon and select the icon. Once the icon is selected, the RSS feed or markup language may be accessed via the service provider of the cellphone/smartphone/dataphone 106*b* and corresponding RSS feed or markup language content may be displayed on the user interface 107*b*. U.S. application Ser. No. 12/056,187, filed on Mar. 26, 2008 discloses an exemplary method and system for customizing a user interface of a device and is hereby incorporated herein by reference in its entirety.

In operation, a user 102 may exhale into open space and the exhaled breath or air may be sensed by one or more detection devices or detectors, such as one or more sensors, sensing members and/or sensing segments in the MEMS sensing and processing module 104. The MEMS sensing and processing module 104 may be operable to detect movement caused by expulsion of human breath by the user 102. One or more electrical, optical and/or magnetic signals may be generated by one or more detection devices or detectors within the MEMS sensing and processing module 104 in response to the detection of movement caused by expulsion of human breath. The processor firmware within the MEMS sensing and processing module 104 may be operable to process the received electrical, optical and/or magnetic signals from the one or more detection device(s) or detector(s) utilizing various algorithms and generate one or more control signals to the device being controlled, for example, the multimedia device 106*a*. The generated one or more control signals may be communicated to the device being controlled, for example, the multimedia device 106*a* via a wired and/or a wireless signal. The processor in the device being controlled may utilize the communicated control signals to control the user interface of the device being controlled, such as a user interface 107*a* of the multimedia device 106*a*, a user interface 107*b* of the cellphone/smartphone/dataphone 106*b*, a user interface 107*c* of the personal computer (PC), laptop or a notebook computer 106*c*, a user interface 107*d* of the display device 106*d*, a user interface 107*e* of the TV/game console/other platform 106*e*, and a user interface of a mobile multimedia player and/or a remote controller.

Figure 1B:
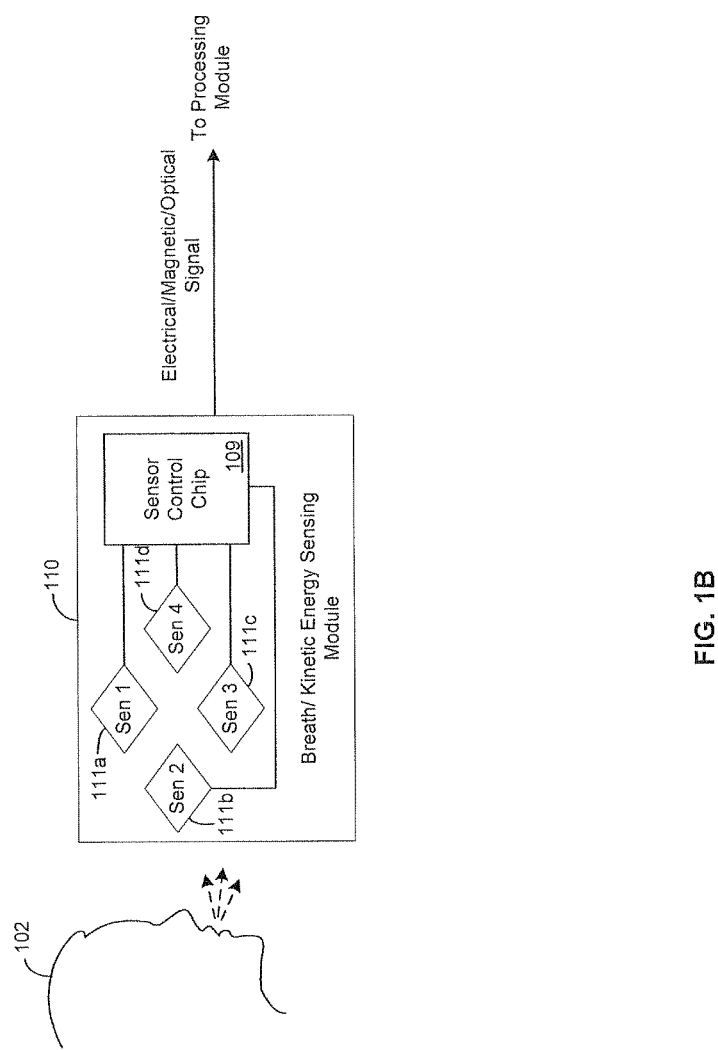
FIG. 1B is a block diagram of an exemplary sensing module to detect human breath, in accordance with an embodiment of the invention.

FIG. 1B is a block diagram of an exemplary detection device or detector to detect human breath, in accordance with an embodiment of the invention. Referring to FIG. 1B, there is shown a user 102 and a sensing module 110. The sensing module 110 may comprise a sensor control chip 109 and a plurality of sensors, for example, 111*a*, 111*b*, 111*c*, and 111*d*. Notwithstanding, the invention may not be so limited and the sensing module 110 may comprise more or less than the number of sensors or sensing members or segments shown in FIG. 1B without limiting the scope of the invention. Accordingly, any number of detectors and sources may be utilized according to the desired size, sensitivity, and resolution desired. Similarly, the type of sources and detectors may comprise other sensing mechanisms, other than visible light. For example, piezoelectric, ultrasonic, Hall effect, electrostatic, and/or permanent or electro-magnet sensors may be activated by deflected MEMS members to generate a signal to be communicated to the sensor control chip 109.

The sensing module 110 may be an electrochemical sensor or any other type of breath analyzing sensor, for example. The plurality of sensors or sensing members or segments 111*a-d* may be an integral part of one or more MEMS devices that may enable the detection of various velocities of air flow from the user's 102 breath. The plurality of sensors or sensing members or segments 111*a-d* may be operable to detect kinetic energy and/or movement caused by the expulsion of human breath by the user 102. The sensor control chip 109 may be operable to generate an electrical, optical and/or magnetic signal that may be communicated to the processor in response to the detection of kinetic energy and/or movement caused by expulsion of human breath.

Figure 1C:
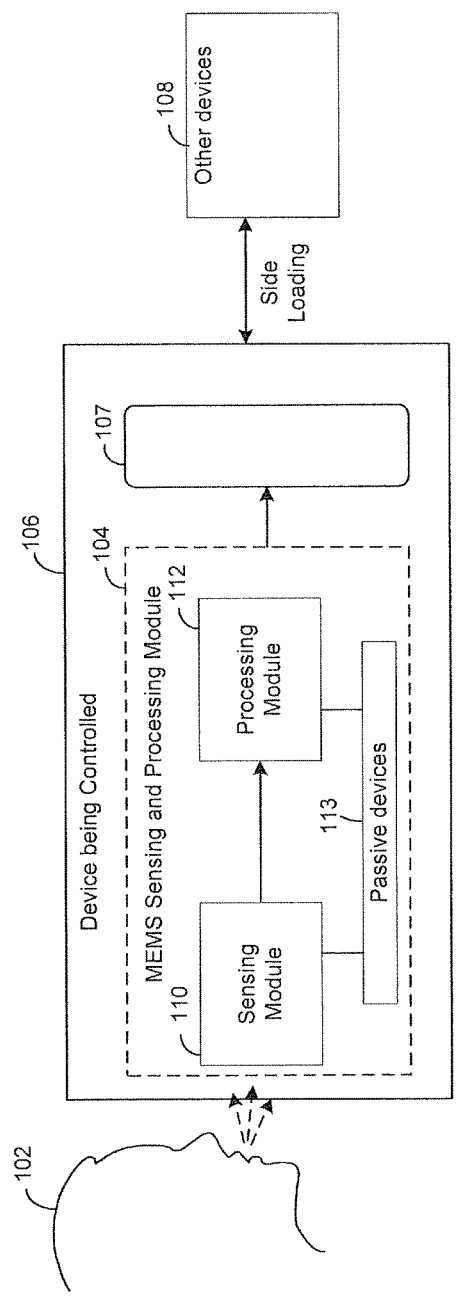
FIG. 1C is a block diagram of another embodiment of an exemplary system for controlling a user interface of a device using human breath, in accordance with an embodiment of the invention.

FIG. 1C is a block diagram of another embodiment of an exemplary system for controlling a user interface of a device using human breath, in accordance with an embodiment of the invention. Referring to FIG. 1C, there is shown a user 102, and a device being controlled 106, such as a multimedia device 106*a*, a cellphone/smartphone/dataphone 106*b*, a PC, laptop or a notebook computer 106*c*, a display device 106*d* and/or a TV/game console/other platform 106*e*. The device being controlled 106 may be wired and/or wirelessly connected to a plurality of other devices 108 for side loading of information. The device being controlled 106 may comprise a MEMS sensing and processing module 104 and a user interface 107.

The MEMS sensing and processing module 104 may comprise a sensing module 110, a processing module 112 and passive devices 113. The passive devices 113, which may comprise resistors, capacitors and/or inductors, may be embedded within a substrate material of the MEMS processing sensing and processing module 104. The processing module 112 may comprise, for example, an ASIC. The sensing module 110 may generally be referred to as a detection device or detector, and may comprise one or more sensors, sensing members and/or sensing segments that may be operable to detect kinetic energy and/or movement caused by the expulsion of human breath by the user 102. The sensing module 110 may be operable to generate an electrical, optical and/or magnetic signal that may be communicated to the processing module 112 in response to the detection of kinetic energy and/or movement caused by expulsion of human breath.

The processing module 112 may comprise suitable logic, circuitry, interfaces, and/or code that may be operable to receive the generated electric signal from the sensing module 110 and generate one or more control signals to the device being controlled 106. In this regard, the processing module 112 may comprise one or more analog to digital converters that may be operable to translate the sensed signal to one or more digital signals, which may be utilized to generate the one or more control signals. The generated one or more control signals may be operable to control the user interface 107 of the device being controlled 106.

Accordingly, the generated one or more signals from the MEMS sensing and processing module 104 may be utilized to control the user interface 107. In an exemplary embodiment of the invention, the one or more signals generated by the MEMS sensing and processing module 104 may be operable to control a pointer on the device being controlled 106 such that items in the user interface 107 may be selected and/or manipulated. In an exemplary embodiment of the invention, the device being controlled may be operable to receive one or more inputs from the other devices 108, which may be utilized to customize or define the user interface 107. The other device 108 may be one or more of a PC, laptop or a notebook computer 106*c* and/or a handheld device, for example, a multimedia device 106*a* and/or a cellphone/smartphone/dataphone 106*b*. In this regard, the other device 108 may be similar to or different from the type of device that is being controlled 106. In some embodiments of the invention, a processor in the other device 108 may be operable to associate or map the data to media content that is remotely accessible by the device being controlled 106. In other embodiments of the invention, a processor in the device being controlled 106 may be operable to associate or map the data to media content that is remotely accessible by the device being controlled 106. U.S. application Ser. No. 12/056,187, filed on Mar. 26, 2008 discloses an exemplary method and system for customizing a user interface of a device and is hereby incorporated herein by reference in its entirety.

Figure 1D:
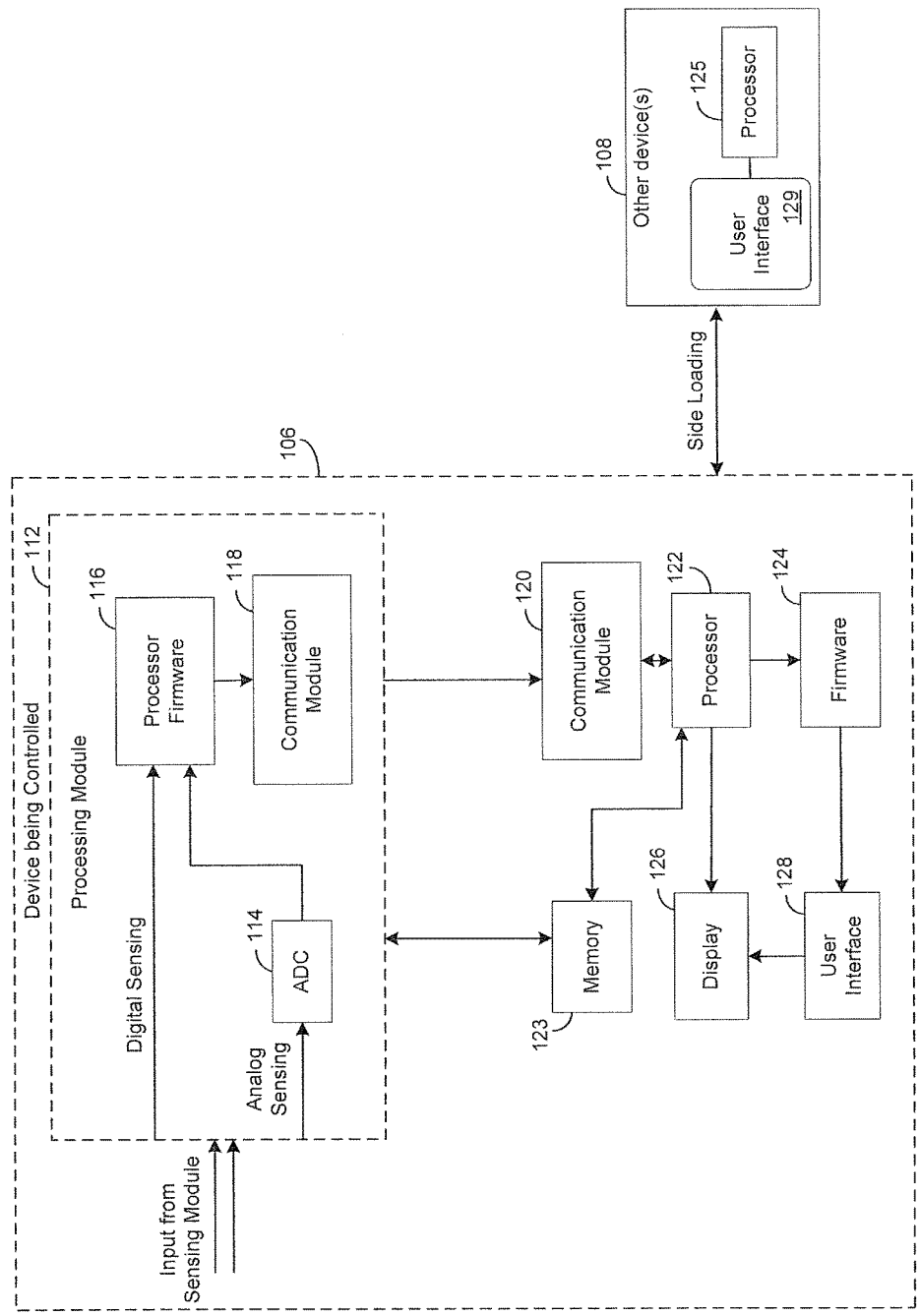
FIG. 1D is a block diagram of an exemplary processor interacting with a device being controlled, in accordance with an embodiment of the invention.

FIG. 1D is a block diagram of an exemplary processor interacting with a device being controlled, in accordance with an embodiment of the invention. Referring to FIG. 1D, there is shown a device being controlled 106 such as a multimedia device 106*a*, a cellphone/smartphone/dataphone 106*b*, a PC, laptop or a notebook computer 106*c*, a display device 106*d* and/or a TV/game console/other platform 106*e*. The device being controlled 106 may comprise a processing module 112, a communication module 120, a processor 122, memory 123, firmware 124, a display 126, and a user interface 128. The processing module 112 may be an ASIC and may comprise one or more analog to digital converters (ADCs) 114, processor firmware 116, and a communication module 118. The device being controlled 106 may be wired and/or wirelessly connected to a plurality of other devices 108 for loading of information via, for example, side loading, or loading via a peer-to-peer connection, and/or a network connection, and by wired and/or wireless communication.

The processing module 112 may comprise suitable logic, circuitry, interfaces, and/or code that may be operable to receive a digital sensing signal and/or an analog sensing signal from the sensing module 110. The ADC 114 may comprise suitable logic, circuitry, interfaces, and/or code that may be operable to receive the generated analog sensing signal from the sensing module 110 and convert the received signal into a digital signal.

The processor firmware 116 may comprise suitable logic, circuitry, and/or code that may be operable to receive and process the digital signal from the ADC 114 and/or the digital sensing signal from the sensing module 110 utilizing a plurality of algorithms to generate one or more control signals. For example, the processor firmware 116 may be operable to read, store, calibrate, filter, modelize, calculate and/or compare the outputs of the sensing module 110. The processor firmware 116 may also be operable to incorporate artificial intelligence (AI) algorithms to adapt to a particular user's 102 breathing pattern. The processor firmware 116 may be operable to generate one or more control signals to the device being controlled 106 based on processing the received digital signals. The generated one or more control signals may be operable to control a user interface of the device being controlled 106, for example, scrolling, zooming, and/or 3-D navigation within the device being controlled 106.

The communication module 118 may comprise suitable logic, circuitry, interfaces, and/or code that may be operable to receive and communicate the generated one or more control signals to the communication module 120. The communication modules 118 and 120 may support a plurality of interfaces. For example, the communication modules 118 and 120 may support an external memory interface, a universal asynchronous receiver transmitter (UART) interface, an enhanced serial peripheral interface (eSPI), a general purpose input/output (GPIO) interface, a pulse-code modulation (PCM) and/or an inter-IC sound (I²S) interface, an inter-integrated circuit (I²C) bus interface, a universal serial bus (USB) interface, a Bluetooth interface, a ZigBee interface, an IrDA interface, and/or a wireless USB (W-USB) interface.

The communication module 120 may be operable to receive the communicated control signals via a wired and/or a wireless signal. The processor 122 may comprise suitable logic, circuitry, interfaces, and/or code that may be operable to utilize the received one or more control signals to control the user interface 128 and/or the display 126. The memory may comprise suitable logic, circuitry, interfaces, and/or code that may be operable to store data on the device being controlled 106. The firmware 124 may comprise a plurality of drivers and operating system (OS) libraries to convert the received control signals into functional commands. The firmware 124 may be operable to map local functions, and convert received control signals into compatible data, such as user customization features, applets, and/or plugins to control the user interface 128.

The device being controlled 106 may be operable to receive one or more inputs defining the user interface 128 from another device 108. The other device 108 may comprise a user interface 129 and a processor 125. The other device 108 may be one or more of a PC, laptop or a notebook computer 106*c* and/or a handheld device, for example, a multimedia device 106*a* and/or a cellphone/smartphone/dataphone 106*b*. In this regard, data may be transferred from the other device 108 to the device being controlled, such as the cellphone/smartphone/dataphone 106*b* and this data may be associated or mapped to media content that may be remotely accessed by the cellphone/smartphone/dataphone 106*b* via a service provider such as a cellular or PCS service provider. The transferred data that is associated or mapped to media content may be utilized to customize the user interface 128 of the device being controlled, such as the cellphone/smartphone/dataphone 106*b*. In this regard, media content associated with one or more received inputs may become an integral part of the user interface 128 of the device being controlled 106.

In some embodiments of the invention, the processor 125 in the other device 108 may be operable to associate or map the data to media content that is remotely accessible by the device being controlled 106. In other embodiments of the invention, the processor 122 in the device being controlled 106 may be operable to associate or map the data to media content that is remotely accessible by the device being controlled 106.

Figure 1E:
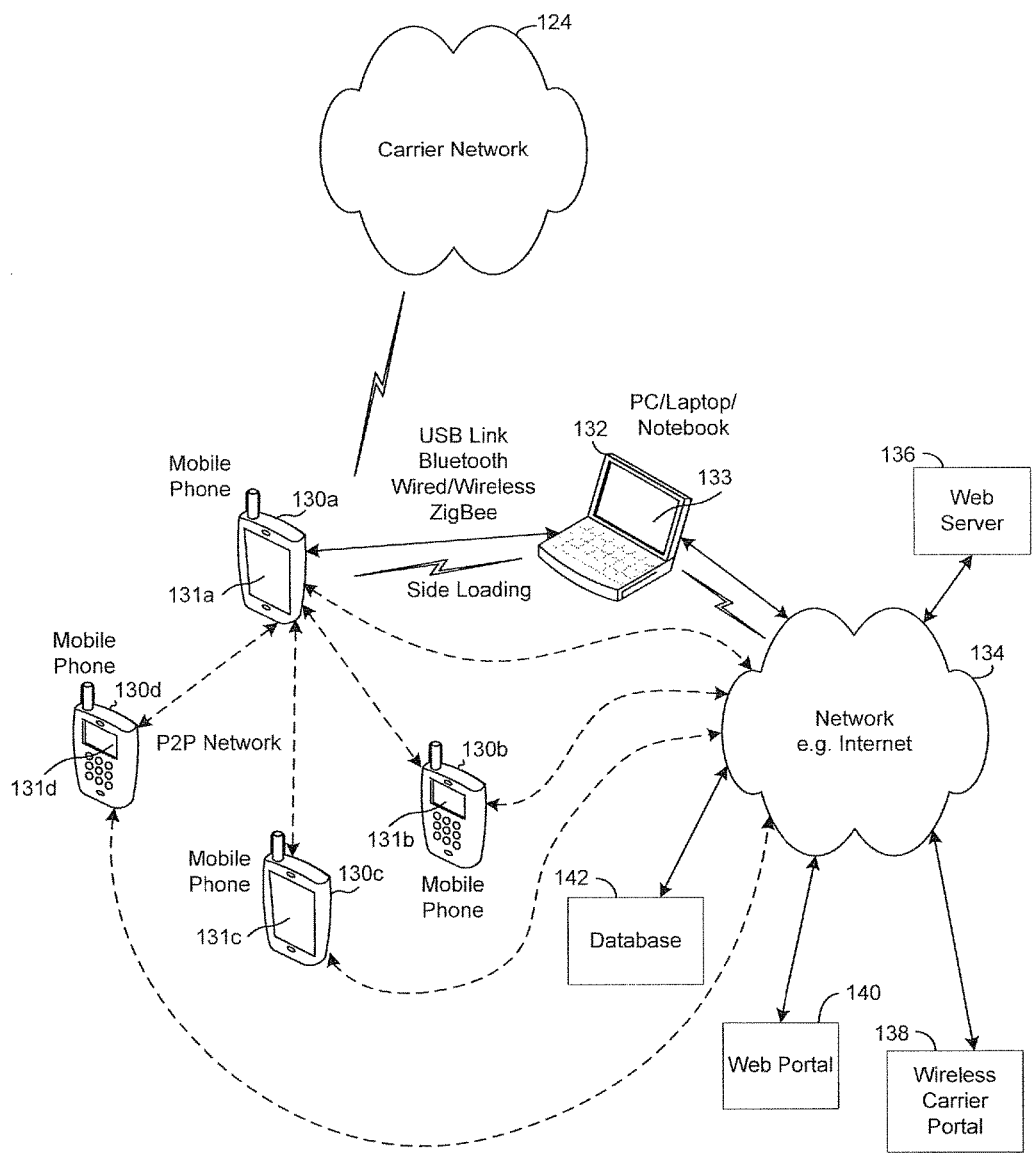
FIG. 1E is a block diagram of an exemplary system for side loading of information between two or more devices, in accordance with an embodiment of the invention.

FIG. 1E is a block diagram of an exemplary system for side loading of information between two or more devices, in accordance with an embodiment of the invention. Referring to FIG. 1E, there is shown a carrier network 124, a plurality of devices being controlled 106, such as, a plurality of mobile phones 130*a*, 130*b*, 130*c* and 130*d*, a PC, laptop or a notebook computer 132 connected to a network 134, such as the Internet. The network 134 may be coupled to a web server 136, a wireless carrier portal 138, a web portal 140 and/or a database 142. Each of the plurality of devices being controlled 106 may have a user interface. For example, the mobile phone 130*a* may have a user interface 131*a*, the mobile phone 130*b* may have a user interface 131*b*, the mobile phone 130*c* may have a user interface 131*c* and the mobile phone 130*d* may have a user interface 131*d*. The PC, laptop or a notebook computer 132 may have a user interface 133.

The carrier network 124 may be a wireless access carrier network. Exemplary carrier networks may comprise 2G, 2.5G, 3G, 4G, IEEE802.11, IEEE802.16 and/or suitable network capable of handling voice, video and/or data communication. The plurality of devices being controlled 106 may be wirelessly connected to the carrier network 124. One of the devices being controlled, such as mobile phone 130*a* may be connected to a plurality of mobile phones 130*b*, 130*c* and 130*d* via a peer-to-peer (P2P) network, for example. The device being controlled, such as mobile phone 130*a* may be communicatively coupled to a PC, laptop, or a notebook computer 132 via a wired or a wireless network. For example, the mobile phone 130*a* may be communicatively coupled to the PC, laptop, or a notebook computer 132 via an infrared (IR) link, an optical link, an USB link, a wireless USB, a Bluetooth link and/or a ZigBee link. Notwithstanding, the invention may not be so limited and other wired and/or wireless links may be utilized without limiting the scope of the invention. The PC, laptop, or a notebook computer 132 may be communicatively coupled to the network 134, for example, the Internet network 134 via a wired or a wireless network. The plurality of devices being controlled, such as the plurality of mobile phones 130*a*, 130*b*, 130*c* and 130*d* may be wirelessly connected to the Internet network 134.

The web server 136 may comprise suitable logic, circuitry, and/or code that may be operable to receive, for example, HTTP and/or FTP requests from clients or web browsers installed on the PC, laptop, or a notebook computer 132 via the Internet network 134, and generate HTTP responses along with optional data contents, such as HTML documents and linked objects, for example.

The wireless carrier portal 138 may comprise suitable logic and/or code that may be operable to function as a point of access to information on the Internet network 134 via a mobile device, such a mobile phone 130*a*, for example. The wireless carrier portal 138 may be, for example, a website that may be operable to provide a single function via a mobile web page, for example.

The web portal 140 may comprise suitable logic and/or code that may be operable to function as a point of access to information on the Internet 134. The web portal 140 may be, for example, a site that may be operable to provide a single function via a web page or site. The web portal 140 may present information from diverse sources in a unified way such as e-mail, news, stock prices, infotainment and various other features. The database 142 may comprise suitable logic, circuitry, and/or code that may be operable to store a structured collection of records or data, for example. The database 142 may be operable to utilize software to organize the storage of data.

In accordance with an embodiment of the invention, the device being controlled, such as the mobile phone 130*a* may be operable to receive one or more inputs defining a user interface 128 from another device, such as the PC, laptop, or a notebook computer 132. One or more processors 122 within the device being controlled 106 may be operable to customize the user interface 128 of the device being controlled, such as the mobile phone 130*a* so that content associated with one or more received inputs may become an integral part of the user interface 128 of the device being controlled, such as the mobile phone 130*a*. The mobile phone 130*a* may be operable to access content directly from the PC, laptop, or a notebook computer 132 rather than from the carrier network 124. This method of uploading and/or downloading customized information directly from the PC, laptop, or a notebook computer 132 rather than from the carrier network 124 may be referred to as side loading.

In accordance with one embodiment of the invention, the user interface 128 may be created, modified and/or organized by the user 102. In this regard, the user 102 may choose, select, create, arrange, manipulate and/or organize content to be utilized for the user interface 128 and/or one or more content components. For example, the user 102 may organize the content components on a screen and may choose content such as personal photographs for background and/or icon images. In addition, the user 102 may create and/or modify the way content components are activated or presented to the user 102. For example, the user 102 may make, import and/or edit icons and/or backgrounds for the user interface 128. Accordingly, the user 102 may associate and/or map the icon to a function so that the user 102 may enable or activate a function via the icon. Exemplary icons may enable functions such as hyper-links, book marks, programs/applications, shortcuts, widgets, RSS or markup language feeds or information, and/or favorite buddies.

In addition, the user 102 may organize and/or arrange content components within the user interface 128. For example, the icons may be organized by category into groups. Groups of icons such as content components may be referred to as affinity banks, for example. In some embodiments of the invention, the processor 125 in the other device 108 may be operable to associate or map the data to media content that is remotely accessible by the device being controlled 106. In other embodiments of the invention, the processor 122 in the device being controlled 106 may be operable to associate or map the data to media content that is remotely accessible by the device being controlled 106. For example, the processor 122 may be operable to associate and/or map an icon to a function so that the user 102 may enable or activate a function via the icon and may organize and/or arrange content components within the user interface 128.

Creation, modification and/or organization of the user interface 128 and/or content components may be performed on the device being controlled, such as mobile phone 130a and/or may be performed on another device such as the PC, laptop, or a notebook computer 132. In this regard, a user screen and/or audio that may be created, modified and/or organized on another device, such as the PC, laptop, or a notebook computer 132 may be side loaded to the device being controlled, such as mobile phone 130a. In addition, the side loaded user interface 128 may be modified and/or organized on the device being controlled, such as mobile phone 130a. For example, a user interface 128 may be side loaded from the PC, laptop, or a notebook computer 132 to the mobile phone 130a and may be customized on the mobile phone 130a. One or more tools may enable creation, modification and/or organization of the user interface 128 and/or audio or visual content components.

Figure 2A:
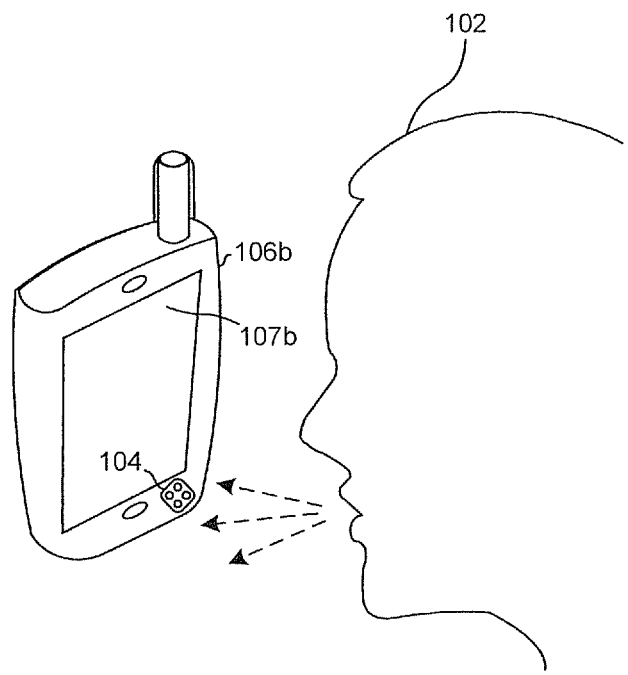
FIG. 2A is a diagram illustrating an exemplary MEMS sensing and processing module embedded in a device, in accordance with an embodiment of the invention.

FIG. 2A is a diagram illustrating an exemplary MEMS sensing and processing module embedded in a device, in accordance with an embodiment of the invention. Referring to FIG. 2A, there is shown a user 102 and a device being controlled, such as a cellphone/smartphone/dataphone 106b. The cellphone/smartphone/dataphone 106b may comprise a user interface 107b, and an embedded MEMS sensing and processing module 104. In one embodiment of the invention, the user 102 may be enabled to exhale into open space and onto the MEMS sensing and processing module 104.

The MEMS sensing and processing module 104 may be operable to detect movement caused by expulsion of human breath by the user 102. In response to the detection of movement caused by expulsion of human breath, the MEMS sensing and processing module 104 may be operable to generate one or more controls signals. The MEMS sensing and processing module 104 may comprise one or more segments or members that may be operable to sense the kinetic energy generated by the expulsion of the human breath and accordingly generate the one or more control signals. The generated one or more control signals may be operable to control a user interface 107b of the cellphone/smartphone/dataphone 106b. In accordance with another embodiment of the invention, the MEMS sensing and processing module 104 may be embedded in an interactive kiosk or panel, for example, an ATM machine. A user 102 may be enabled to blow a puff of air at the MEMS sensing and processing module 104 that is embedded in the interactive kiosk in order to access and/or interact with a user interface of the interactive kiosk, for example.

Figure 2B:
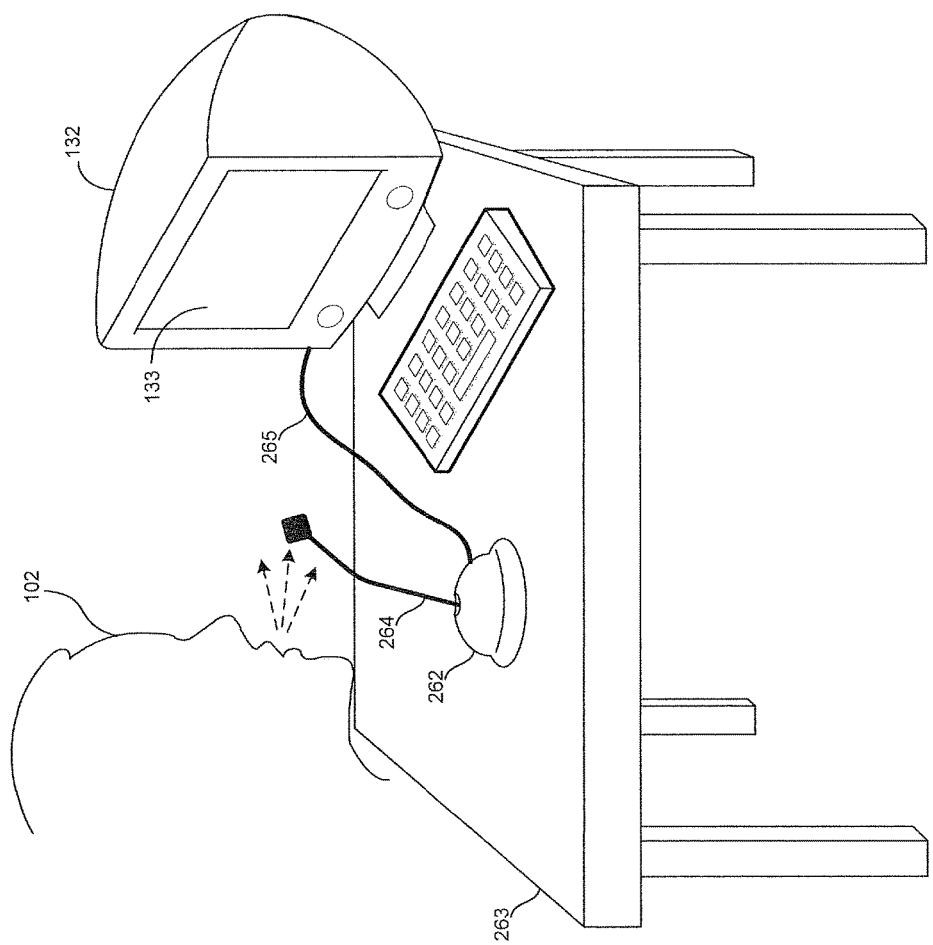
FIG. 2B is a diagram illustrating an exemplary MEMS sensing and processing module located on a stand alone device that is communicatively coupled to a device via a USB interface, in accordance with an embodiment of the invention.

FIG. 2B is a diagram illustrating an exemplary MEMS sensing and processing module located on a stand alone device that is communicatively coupled to a device via a USB interface, in accordance with an embodiment of the invention. Referring to FIG. 2B, there is shown a stand alone device 262, and another device, such as the PC, laptop, or a notebook computer 132. The stand alone device 262 may be placed on any suitable surface, for example, on a table or desk top 263. The stand alone device 262 may comprise a flexible support structure 264. The support structure 264 may comprise the MEMS sensing and processing module 104 located on one end, for example. Notwithstanding, the invention may not be so limited and the MEMS sensing and processing module 104 may be located at other locations on the stand alone device 262, for example in a base of the stand alone device 262. Notwithstanding, the invention may not be limited in this regard, and the location of the MEMS sensing and processing module 104 within or on the stand alone device 262 may vary accordingly. The MEMS sensing and processing module 104 may be communicatively coupled to the PC, laptop, or a notebook computer 132 via a USB interface 265, for example.

The MEMS sensing and processing module 104 may be operable to detect movement caused by the expulsion of human breath by the user 102. In response to the detection of movement caused by expulsion of a fluid such as air from human breath, the MEMS sensing and processing module 104 may be operable to generate one or more controls signals. The MEMS sensing and processing module 104 may comprise one or more segments or members that may be operable to sense the kinetic energy generated by the expulsion of the human breath and accordingly generate the one or more control signals. The generated one or more control signals may be communicated to another device to be controlled, such as PC, laptop, or a notebook computer 132. The generated one or more control signals may be operable to control a user interface 133 of the PC, laptop, or a notebook computer 132.

Figure 2C:
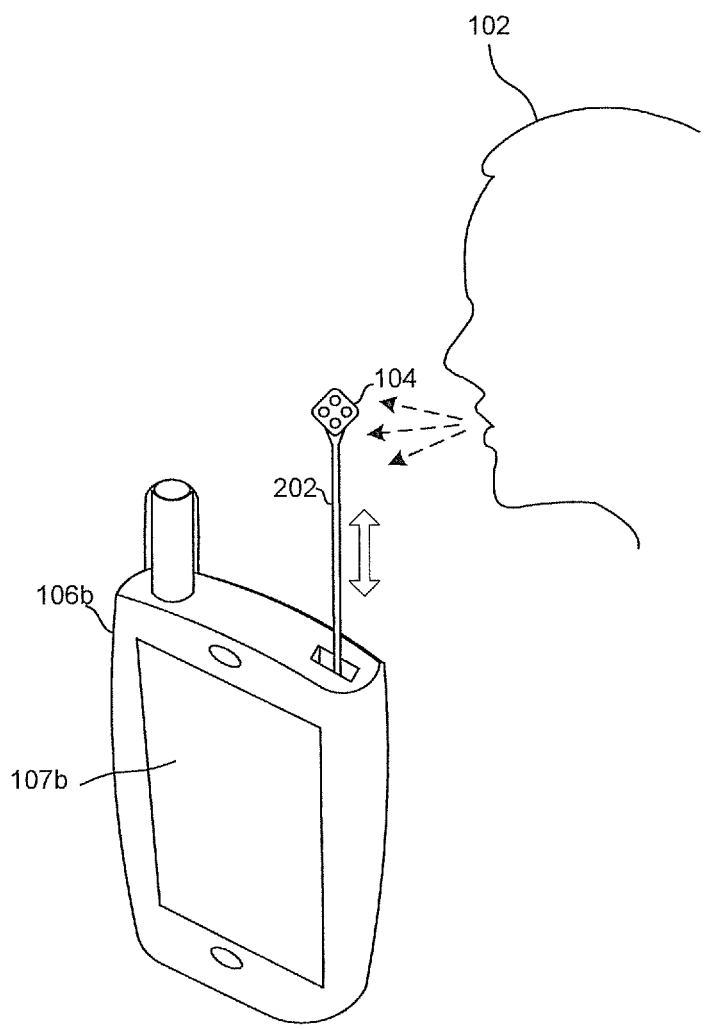
FIG. 2C is a diagram illustrating an exemplary MEMS sensing and processing module located on a stylus, in accordance with an embodiment of the invention.

FIG. 2C is a diagram illustrating an exemplary MEMS sensing and processing module located on a stylus, in accordance with an embodiment of the invention. Referring to FIG. 2C, there is shown a user 102 and a device being controlled, such as a cellphone/smartphone/dataphone 106b. The cellphone/smartphone/dataphone 106b may comprise a user interface 107b, and a stylus 202. The stylus 202 may be retractable, collapsible, pivotable about an axis or axes and/or flexible and may be enclosed within the body of the cellphone/smartphone/dataphone 106b. Notwithstanding, the stylus 202 may be a foldable device that may be clipped to the body of the cellphone/smartphone/dataphone 106b without limiting the scope of the invention.

The stylus 202 may comprise the MEMS sensing and processing module 104 located on one end, for example. In one embodiment of the invention, the user 102 may be enabled to retract the stylus 202 and exhale into open space and onto the MEMS sensing and processing module 104.

The MEMS sensing and processing module 104 may be operable to detect movement caused by expulsion of human breath by the user 102. In response to the detection of movement caused by expulsion of human breath, the MEMS sensing and processing module 104 may be operable to generate one or more controls signals. The MEMS sensing and processing module 104 may comprise one or more segments or members that may be operable to sense the kinetic energy generated by the expulsion of the human breath and accordingly generate the one or more control signals. The generated one or more control signals may be operable to control a user interface 107b of the cellphone/smartphone/dataphone 106b.

Figure 2D:
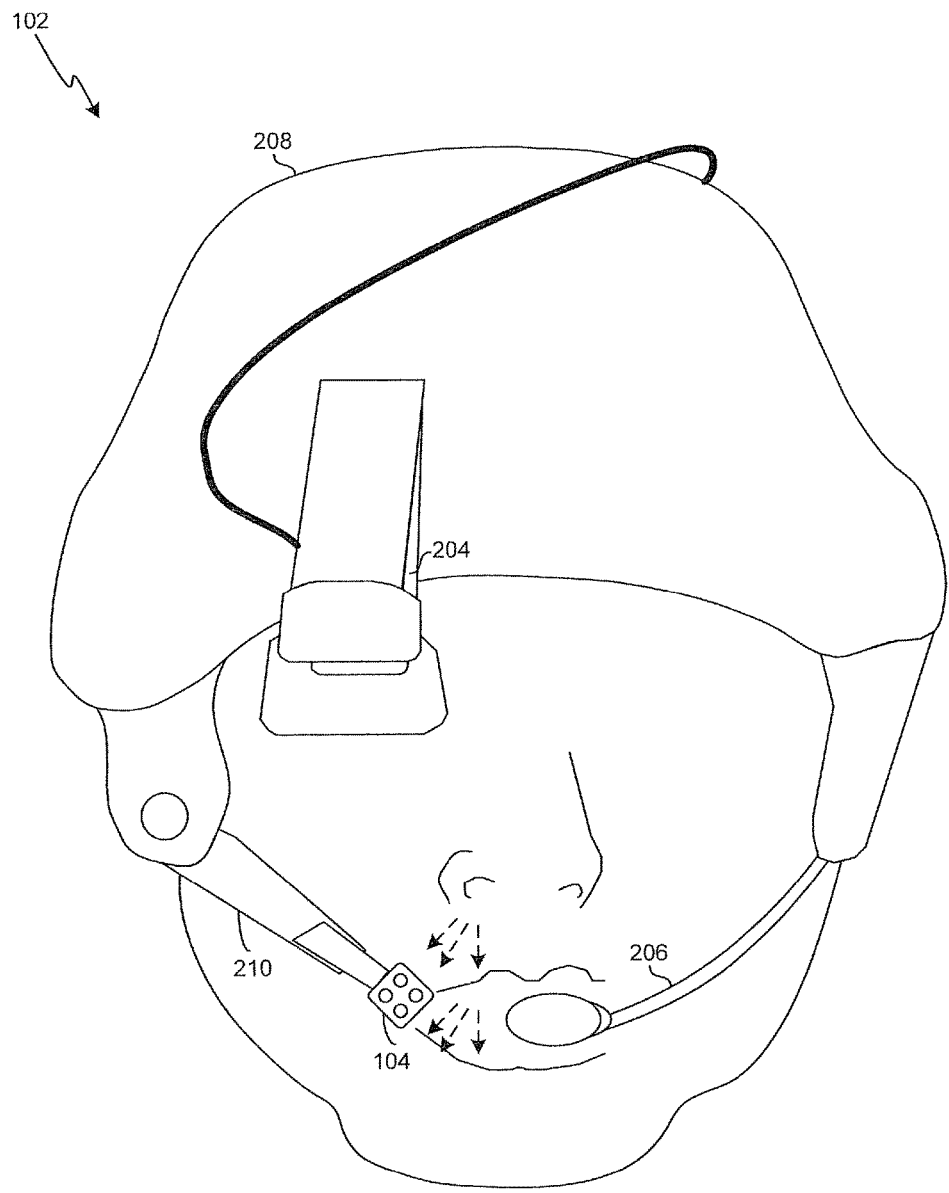
FIG. 2D is a diagram illustrating an exemplary MEMS sensing and processing module located on a headset for military personnel, in accordance with an embodiment of the invention.

FIG. 2D is a diagram illustrating an exemplary MEMS sensing and processing module located on a headset for military personnel, in accordance with an embodiment of the invention. Referring to FIG. 2D, there is shown a user 102. The user 102 may wear a detachable helmet 208. The detachable helmet 208 may comprise detachable eyewear 204, a detachable microphone 206, and a detachable headset 210. The detachable headset 210 may comprise the MEMS sensing and processing module 104 located on one end, for example.

The detachable eyewear 204 may comprise night vision and/or infrared vision capabilities, for example. The detachable microphone 206 may be utilized to communicate with other users, for example. In one embodiment of the invention, the user 102 may be enabled to exhale into open space and the MEMS sensing and processing module 104 may be operable to sense or detect the exhalation. The exhalation may occur from the nostrils and/or the mouth of the user 102.

The MEMS sensing and processing module 104 may be operable to detect movement caused by expulsion of human breath by the user 102. In response to the detection of movement caused by expulsion of human breath, the MEMS sensing and processing module 104 may be operable to generate one or more controls signals. The generated one or more control signals may be operable to control a user interface of the device being controlled such as a user interface 107a of the multimedia device 106a, a user interface 107b of the cellphone/smartphone/dataphone 106b, a user interface 107c of the personal computer (PC), laptop or a notebook computer 106c and/or a user interface 107d of the display device 106d.

Figure 2E:
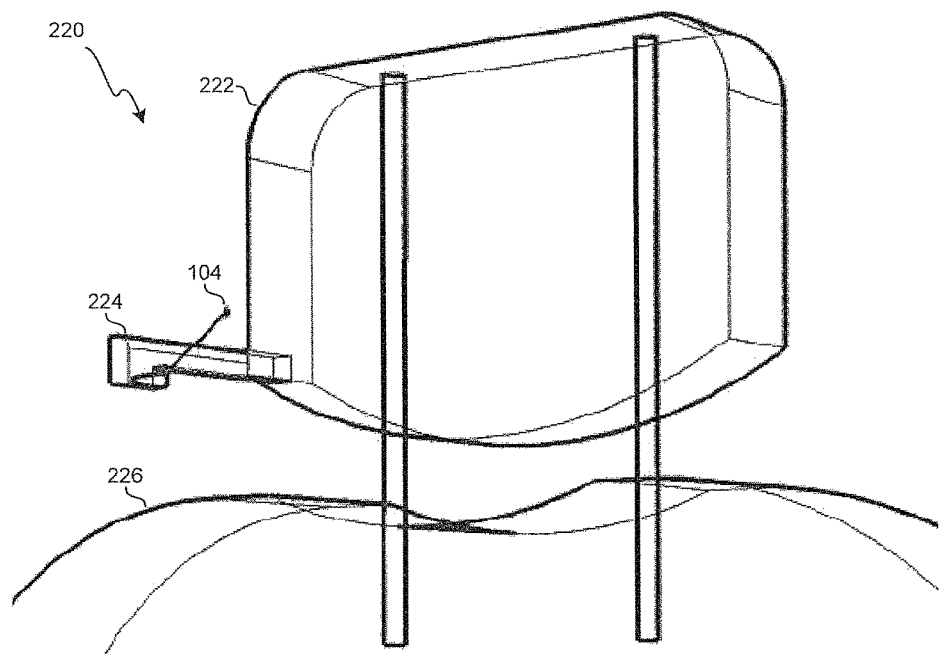
FIG. 2E is a diagram illustrating an exemplary MEMS sensing and processing module located on a headrest of a seating apparatus, in accordance with an embodiment of the invention.

FIG. 2E is a diagram illustrating an exemplary MEMS sensing and processing module located on a headrest of a seating apparatus, in accordance with an embodiment of the invention. Referring to FIG. 2E, there is shown a seating apparatus 220. The seating apparatus 220 may comprise a headrest 222, a backrest 226. The headrest 222 may comprise a detachable headset 224. The user 102 may be enabled to sit in the seating apparatus 220.

The detachable headset 224 may comprise the MEMS sensing and processing module 104 located on one end, for example. In one embodiment of the invention, the user 102 may be enabled to exhale into open space and onto the MEMS sensing and processing module 104. In one embodiment, the seating apparatus 220 may be located inside a car or any other automobile or vehicle, for example. Notwithstanding, the invention may not be so limited and the MEMS sensing and processing module 104 may be located at other locations without limiting the scope of the invention.

The MEMS sensing and processing module 104 may be operable to detect movement caused by expulsion of human breath by the user 102 seated in the seating apparatus 220. In response to the detection of movement caused by expulsion of human breath, the MEMS sensing and processing module 104 may be operable to generate one or more controls signals. The generated one or more control signals may be operable to control a user interface of the device being controlled such as a user interface 107a of the multimedia device 106a, a user interface 107b of the cellphone/smartphone/dataphone 106b, a user interface 107c of the personal computer (PC), laptop or a notebook computer 106c, a user interface 107d of the display device 106d, and/or the user interface of a multimedia player, such as a audio and/or video player.

Figure 2F:
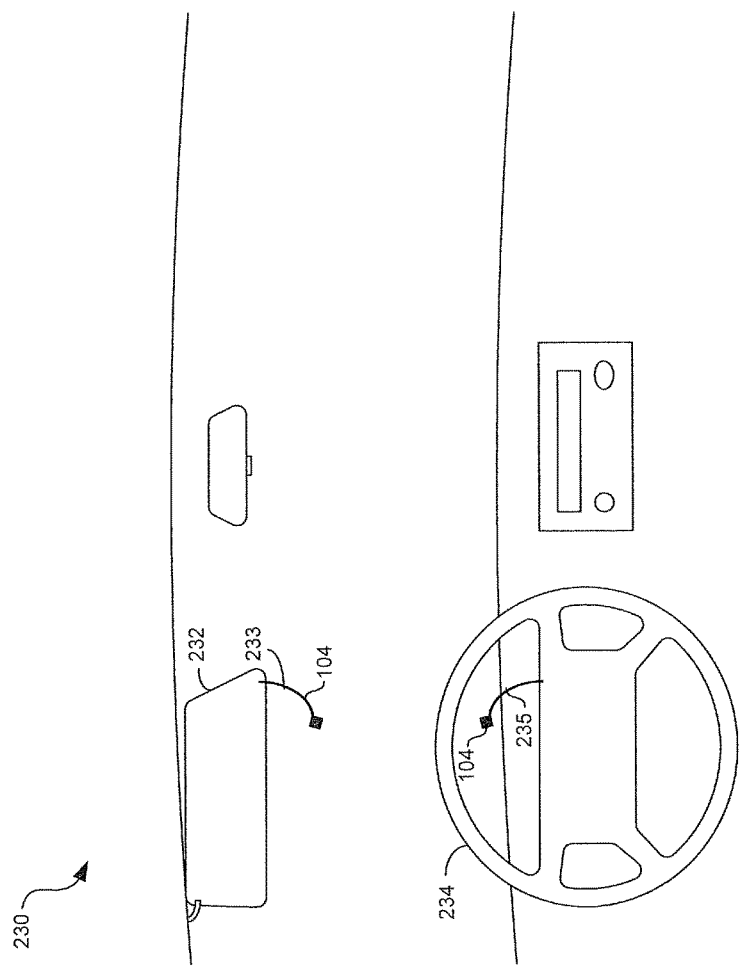
FIG. 2F is a diagram illustrating an exemplary MEMS sensing and processing module located inside an automobile, in accordance with an embodiment of the invention.

FIG. 2F is a diagram illustrating an exemplary MEMS sensing and processing module located inside an automobile, in accordance with an embodiment of the invention. Referring to FIG. 2F, there is shown an automobile 230. The automobile 230 may comprise a visor 232 and a steering wheel 234.

In one embodiment of the invention, the visor 232 may comprise a flexible support structure 233. The support structure 233 may comprise the MEMS sensing and processing module 104 located on one end, for example. In another embodiment of the invention, the steering wheel 234 may comprise a flexible support structure 235. The support structure 235 may comprise the MEMS sensing and processing module 104 located on one end, for example. Notwithstanding, the invention may not be so limited and the MEMS sensing and processing module 104 may be located at other locations within the automobile 230 without limiting the scope of the invention.

For example and without limitation, the user 102 may be seated in the seat behind the steering wheel 234, with the processing module 104 mounted on the steering wheel 234. The user 102 may be seated in the seat behind the steering wheel 234. The user 102 may be enabled to exhale into open space and onto the MEMS sensing and processing module 104. The MEMS sensing and processing module 104 may be operable to detect movement caused by expulsion of human breath by the user 102. In response to the detection of movement caused by expulsion of human breath, the MEMS sensing and processing module 104 may be operable to generate one or more controls signals to control a user interface of the device being controlled such as a user interface 107a of the multimedia device 106a, a user interface 107b of the cellphone/smartphone/dataphone 106b, a user interface 107c of the personal computer (PC), laptop or a notebook computer 106c, a user interface 107d of the display device 106d, and/or the user interface of a multimedia or other device, such as a audio and/or video player or a navigation (e.g., GPS) device.

Figure 2G:
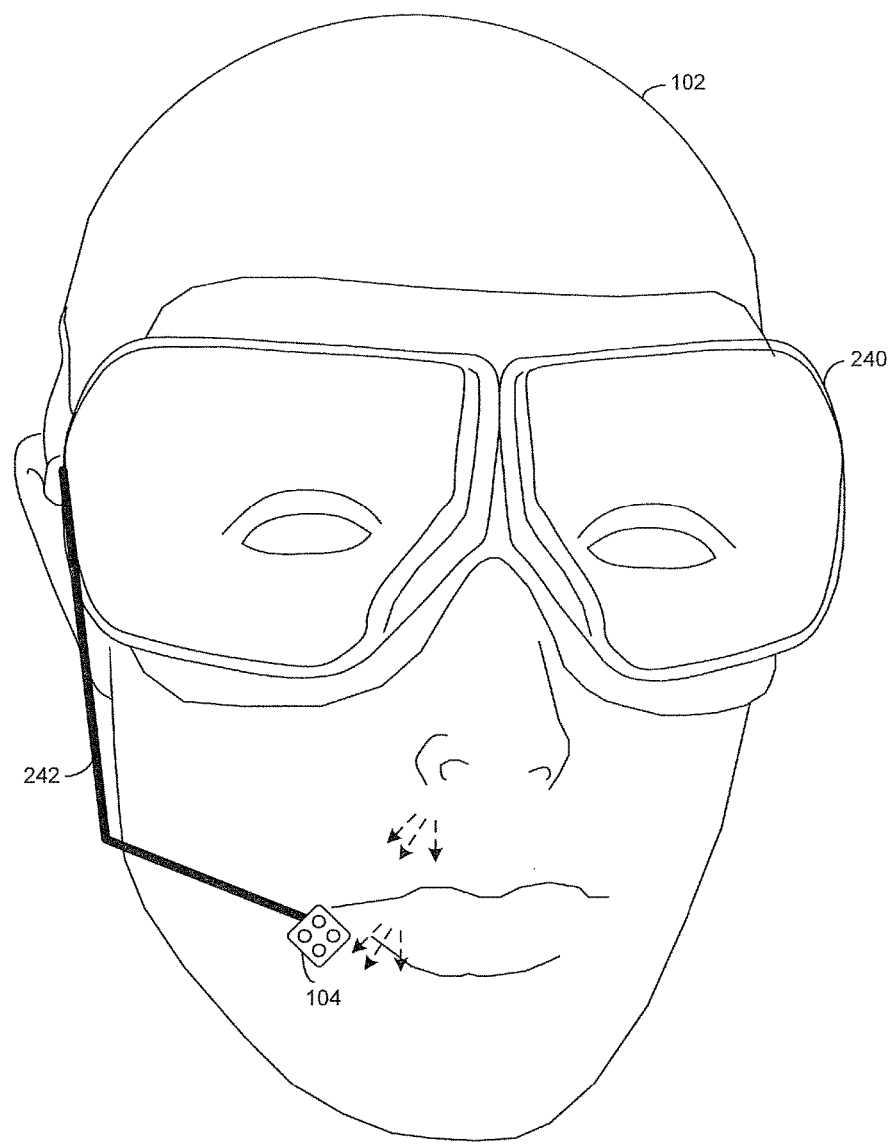
FIG. 2G is a diagram illustrating an exemplary MEMS sensing and processing module located on detachable eyewear, in accordance with an embodiment of the invention.

FIG. 2G is a diagram illustrating an exemplary MEMS sensing and processing module located on detachable eyewear, in accordance with an embodiment of the invention. Referring to FIG. 2G, there is shown a user 102. The user 102 may wear detachable goggles or any other type of eyewear 240, for example. The detachable eyewear 240 may comprise a detachable headset 242. The detachable headset 242 may be flexible and/or deflectable. The detachable headset 242 may comprise the MEMS sensing and processing module 104 located on one end, for example. In one embodiment of the invention, the user 102 may be enabled to exhale into open space and onto the MEMS sensing and processing module 104.

The MEMS sensing and processing module 104 may be operable to detect movement caused by expulsion of human breath by the user 102 seated in the seating apparatus 102. In response to the detection of movement caused by expulsion of human breath, the MEMS sensing and processing module 104 may be operable to generate one or more controls signals to control a user interface of the device being controlled such as a user interface 107a of the multimedia device 106a, a user interface 107b of the cellphone/smartphone/dataphone 106b, a user interface 107c of the personal computer (PC), laptop or a notebook computer 106c, a user interface 107d of the display device 106d, and/or the user interface of a multimedia player, such as a audio and/or video player.

Figure 2H:
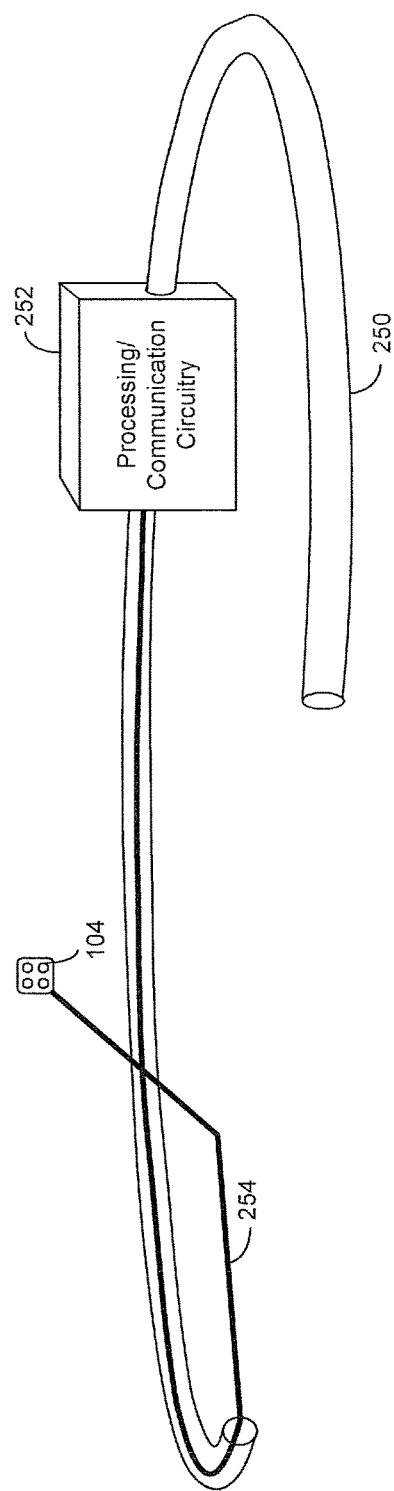
FIG. 2H is a diagram illustrating an exemplary MEMS sensing and processing module located on a neckset, in accordance with an embodiment of the invention.

FIG. 2H is a diagram illustrating an exemplary MEMS sensing and processing module located on a neckset, in accordance with an embodiment of the invention. Referring to FIG. 2H, there is shown a detachable neckset 250. The detachable neckset 250 may comprise a flexible printed circuit board (PCB) 254 and processing and/or communication circuitry 252. The flexible PCB 254 may comprise the MEMS sensing and processing module 104 located on one end, for example.

The processing and/or communication circuitry 252 may comprise a battery, a voltage regulator, one or more switches, one or more light emitting diodes (LEDs), a liquid crystal display (LCD), other passive devices such as resistors, capacitors, inductors, a communications chip capable of handling one or more wireless communication protocols such as Bluetooth and/or one or more wired interfaces. In an exemplary embodiment of the invention, the processing and/or communication circuitry 252 may be packaged within a PCB. Notwithstanding, the invention may not be so limited and the processing and/or communication circuitry 252 may comprise other components and circuits without limiting the scope of the invention.

In one embodiment of the invention, the user 102 may be enabled to wear the neckset 250 around his/her neck and exhale into open space and the MEMS sensing and processing module 104 may be operable to sense or detect the exhalation. The exhalation may occur from the nostrils and/or the mouth of the user 102.

The MEMS sensing and processing module 104 may be operable to detect movement caused by expulsion of human breath by the user 102. In response to the detection of movement caused by expulsion of human breath, the MEMS sensing and processing module 104 may be operable to generate one or more controls signals via the flexible PCB 254 to the processing and/or communication circuitry 252. The processing and/or communication circuitry 252 may be operable to process and communicate the generated one or more control signals to a device being controlled, such as a multimedia device 106a, a cellphone/smartphone/dataphone 106b, a personal computer (PC), laptop or a notebook computer 106c and/or a display device 106d. On or more processors within the device being controlled may be operable to utilize the communicated control signals to control a user interface of the device being controlled such as a user interface 107a of the multimedia device 106a, a user interface 107b of the cellphone/smartphone/dataphone 106b, a user interface 107c of the personal computer (PC), laptop or a notebook computer 106c and/or a user interface 107d of the display device 106d.

FIG. 2I is a diagram illustrating an exemplary MEMS sensing and processing module located on a clip, in accordance with an embodiment of the invention. Referring to FIG. 2I, there is shown a user 102 and a clip 272. The clip 272 may be placed on any suitable piece of clothing, for example, on a collar of a shirt, a lapel of a coat or a pocket. The clip 272 may comprise a flexible support structure 274, for example. Although a clip 272 is illustrated, other suitable attachment structure may be utilized to affix the support structure 274. The support structure 274 may comprise the MEMS sensing and processing module 104, the latter of which may be located on one end of or anywhere on the support structure 274, for example. In other exemplary embodiments of the invention, the support structure 274 may not be utilized and the MEMS sensing and processing module 104 may be attached to the clip 272 or other suitable attachment structure.

The MEMS sensing and processing module 104 may be operable to detect movement caused by the expulsion of human breath by the user 102. In response to the detection of movement caused by expulsion of human breath, the MEMS sensing and processing module 104 may be operable to generate one or more controls signals. The MEMS sensing and processing module 104 may comprise one or more segments or members that may be operable to sense the kinetic energy generated by the expulsion of the human breath and accordingly generate the one or more control signals. The generated one or more control signals may be enabled to control a user interface 107b of the cellphone/smartphone/dataphone 106b.

FIG. 2J is a diagram illustrating an exemplary MEMS sensing and processing module embedded in a fabric, in accordance with an embodiment of the invention. Referring to FIG. 2J, there is shown a user 102 and a fabric 276. The fabric 276 may be any suitable piece of clothing, for example, a collar of a shirt, a lapel of a coat or a pocket. The fabric 276 may comprise an embedded MEMS sensing and processing module 104, the latter of which may be located within or anywhere on the fabric 276 274, for example. Notwithstanding, the invention may not be so limited and the MEMS sensing and processing module 104 may be placed at other locations on the outerwear or innerwear of the user 102 without limiting the scope of the invention. In this regard, the MEMS sensing and processing module 104 may be fabricated to be flexible so that the MEMS sensing and processing module 104 may be placed or interwoven in the fabric 276.

The MEMS sensing and processing module 104 may be operable to detect movement caused by the expulsion of human breath by the user 102. In response to the detection of movement caused by expulsion of human breath, the MEMS sensing and processing module 104 may be operable to generate one or more controls signals. The MEMS sensing and processing module 104 may comprise one or more segments or members that may be operable to sense the kinetic energy generated by the expulsion of the human breath and accordingly generate the one or more control signals. The generated one or more control signals may be enabled to control a user interface 107b of the cellphone/smartphone/dataphone 106b.

Figure 3A:
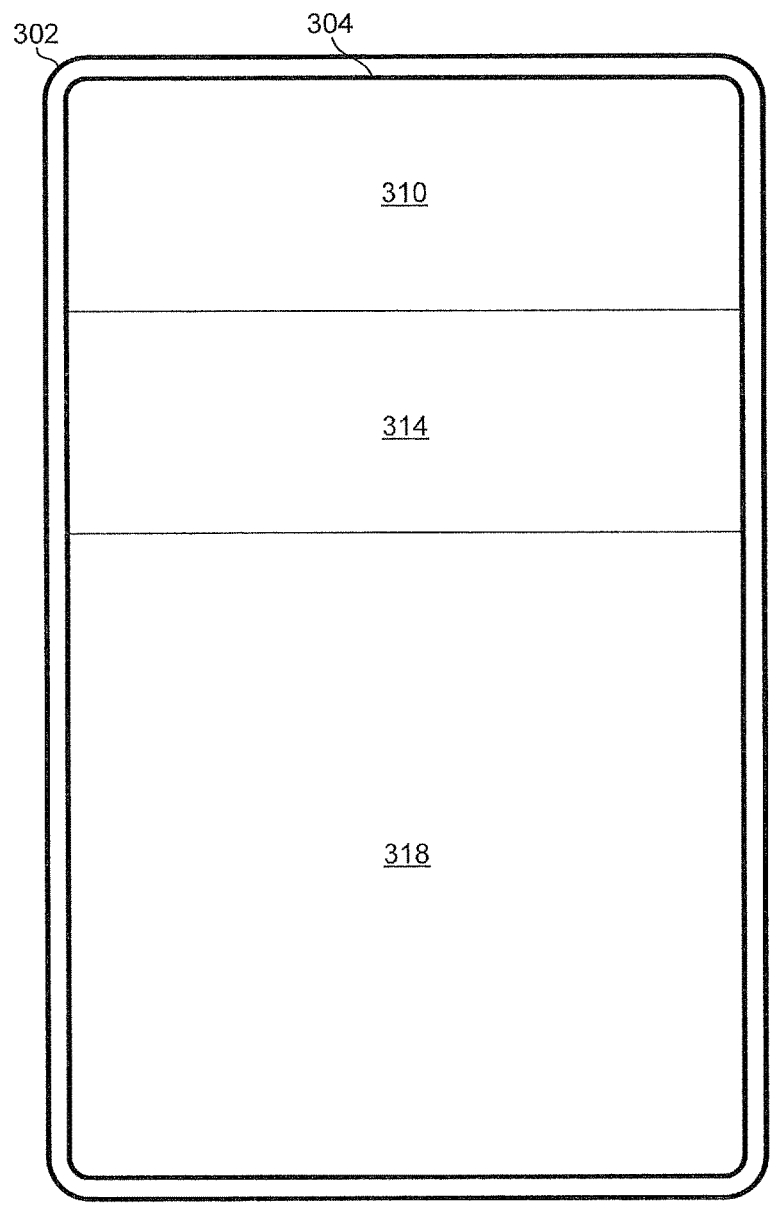
FIG. 3A is a diagram illustrating an exemplary electronic device that may be controlled via a sectional user interface, in accordance with an embodiment of the invention.

FIG. 3A is a diagram illustrating an exemplary electronic device that may be controlled via a sectional user interface, in accordance with an embodiment of the invention. Referring to FIG. 3A, there is shown an electronic device 302 comprising a touchscreen display 304. In this regard, although a touchscreen display is utilized for illustration, the electronic device 302 may comprise a non-touchscreen display and one or more input devices such as a trackball, one or more multi-function buttons, and/or a keyboard, without deviating from the scope of the present invention.

The electronic device 302 may comprise a user interface, such as a graphical user interface (GUI), which may enable a user to navigate through and launch the various applications and/or functions on the electronic device 302. In this regard, the user interface may enable interacting with the electronic device via respiratory inputs such as exhalations, tactual inputs such as button presses, audio actions such as voice commands, and/or movements of the electronic device 302 such as those detected by an accelerometer and/or gyroscope. In this regard, the user interface may enable interacting with the electronic device 302 via any combination of one or more of the input methods. Furthermore, the user interface may be operable to detect an error and/or failure of one or more input methods and default to one or more other input methods. In this manner, interacting with the user interface may not be critically impacted by the failure and/or absence of a particular input method.

The user interface of the electronic device 302 may display information about the status and/or capabilities of the electronic device 302 and/or display information and/or content generated by one or more applications on the electronic device 302. In various embodiments of the invention, upon powering on the electronic device 302, a homescreen of the user interface may be displayed or presented. In various embodiments of the invention, the electronic device 302 may comprise one or more of a cellular telephone, a Smartphone, a wireless telephone, a notebook computer, a personal media player, a personal digital assistant, a multimedia device, a handheld device and/or a multi-function mobile device.

Figure 3B:
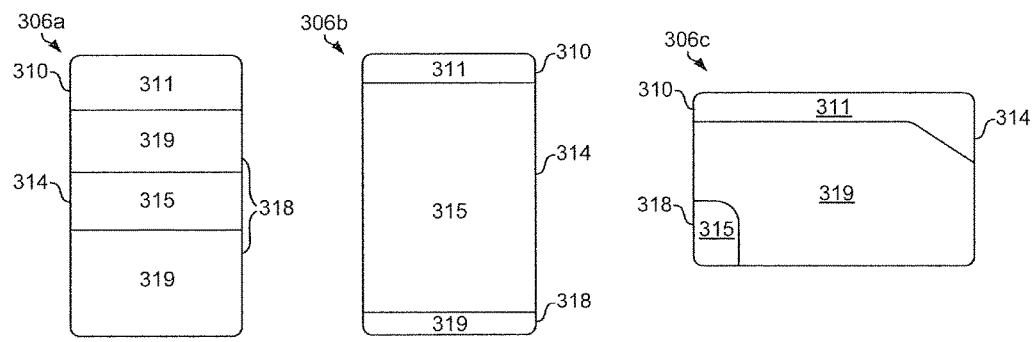
FIG. 3B is a diagram illustrating several exemplary configurations of a sectional user interface, in accordance with an embodiment of the invention.

The user interface may be sectioned into one or more of a fixed region 310 comprising one or more fixed zones 311, a control region 314 comprising one or more control zones 315, and a content region 318 comprising one or more content zones 319. In this regard, each of the regions 310, 314, and 318, when present, may be of any size and/or shape and may be in any location(s) of the display 304. Moreover, the presence, size, shape, and location(s) of the regions 310, 314, and 320 may be configured (i.e., personalize or customize) by a user of the electronic device 302. For example, the electronic device 302 may comprise a user interface customization application which a user may run to configure the regions of the user interface based on preferences such as whether the user is right handed or left handed. In this regard, exemplary configurations 306a, 306b, and 306c of the user interface are illustrated in FIG. 3B.

Figure 3C:
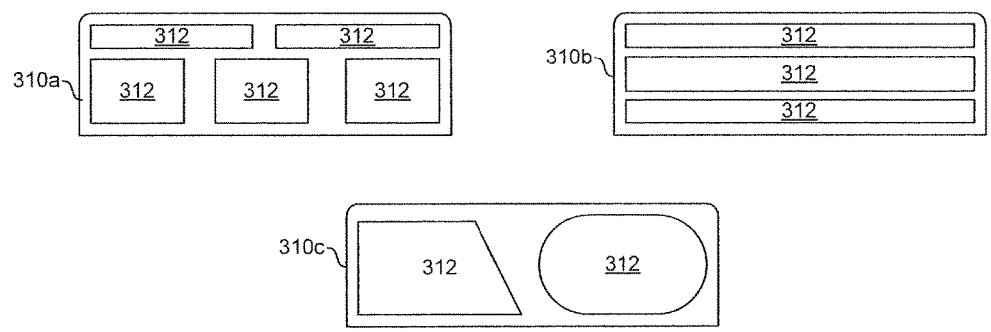
FIG. 3C is a diagram illustrating several exemplary fixed regions of a sectional user interface, in accordance with an embodiment of the invention.

The fixed region 310 may display information independent of a state of and/or activity in the control region 314. Exemplary information that may be displayed in the fixed region 310 may comprise the day, the time, weather, appointments in a calendar, RSS (or XML, or other markup language) feeds, recent email contacts, and/or recent phone contacts. However, the preceding are just examples of information that may be displayed in the fixed region 310 and the invention may not be so limited. Additionally, the size, shape and/or location of the fixed region 310 may change depending on what functions and/or applications are running on the electronic device 302. Furthermore, the type and/or amount of information displayed in the fixed region 310 may be customized by a user of the electronic device 302. In this regard, FIG. 3C illustrates some exemplary fixed regions 310a, 310b, and 310c.

The control region 314 may enable controlling the electronic device 302 such that desired information may be displayed and/or desired applications and/or functions may be launched on the electronic device 302. In this regard, respiratory and/or tactual input may be utilized to scroll, select, manipulate, or otherwise affect objects, such as text, images, links, and/or icons, of the user interface. In this regard, additional details of interacting with objects of the user interface utilizing respiratory and tactual input are described below with respect to FIG. 3E. Additionally, the type and/or amount of information displayed in the control region 314 may be customized by a user of the electronic device 302. Furthermore, the size, shape and/or location of the control region 314 may change depending on what functions and/or applications are running on the electronic device 302.

Figure 3D:
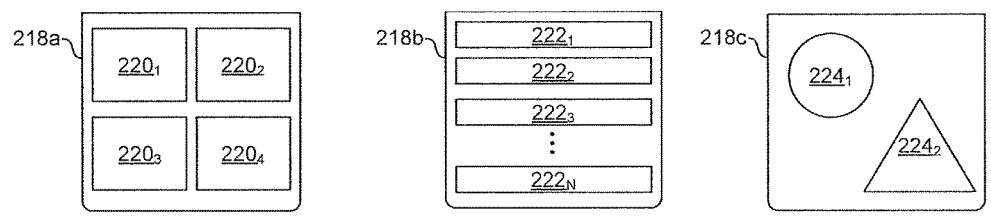
FIG. 3D is a diagram illustrating several exemplary content regions of a sectional user interface, in accordance with an embodiment of the invention.

The content region 318 may display information that may depend on a state of and/or activity in the control region 314. For example, the information in the content region 318 may depend on an active icon in the control region. In this regard, an active icon may be an icon which has been navigated to (via breath and/or tactual input) but has not been selected via a "click" (e.g., a tap on a touch screen, a button press or a puff of air). In one exemplary embodiment of the invention, the active icon may be link to a website and the content region 318 may display RSS feeds from that website. In another exemplary embodiment of the invention, the active icon may be a shortcut to launch an email client and the content region 318 may display one or more recent email messages. In this regard, exemplary information displayed in the content region 318 may comprise RSS or XML feeds, images, a calendar, recent calls, recent texts, and/or recent emails. However, the preceding are just examples and the invention is not so limited. Additionally, the information displayed in the content region 318 may be customizable by a user of the electronic device 302. Furthermore, the size, shape and/or location of the content region 318 may change depending on what functions and/or applications are running on the electronic device 302. In this regard, FIG. 3D illustrates a few exemplary content regions 318a, 318b and 318c.

In various embodiments of the invention, the display 304 may be a touchscreen and the control region 314 may be responsive to a range of tactual inputs, as opposed to the fixed region 310 and/or the content region 318 which may have limited response to tactual inputs. For example, the control region 314 may be responsive to tactual movements, a number of touches, and/or duration of touches while the fixed region 310 and the content region 318 may be responsive to multiple touches (e.g., a double tap). In this manner, limiting the amount of the display 304 that may be allocated to the control region 314 may reduce the amount of area that a user needs to be able to reach in order to navigate and select icons, thus facilitating single-handed operation of the electronic device 302. Additionally, limiting the tactual responsiveness of the fixed region 310 and the content region 318 may reduce inadvertent actions and/or selections (i.e., inadvertent "clicks").

Information in the fixed region 310 and/or the content region 318 may be displayed in the form of one or more objects, such as images, text, links and/or icons. In various embodiments of the invention, objects in the fixed region 310 and/or the content region 318 may be selectable via tactual and/or respiratory input. However, the response of the fixed region 310 and/or the content region 318 may be limited, as described above, to prevent inadvertent clicks. Additionally, in various embodiments of the invention, objects in the content region 318 may be scrolled into the control region 314 such that they may become selectable.

For example, respiratory input may be utilized to scroll objects from the content region 318 into the control region 314 such that the object may be selected via tactual input to the control region 310.

Thus, the sectional user interface of the electronic device 302 may be described as a universal content access manager (UCAM) which may provide advantages over traditional graphical user interfaces. One advantage may be that the configurability (i.e. customization or personalization) of the UCAM may greatly increase the utility and/or ease of use of the electronic device 302 over a similar device having a conventional graphical user interface. In this regard, objects in each section may be sequenced, juxtaposed, superimposed, overlaid, or otherwise positioned and/or organized such that a user may quickly access desired information, applications, and/or functions. Another advantage may be the ability to section the UCAM into one or more regions may greatly increase the utility and/or ease of use of the electronic device 302 over a similar device having a conventional graphical user interface. In this regard, portions of each region may be configured to be responsive or non-responsive to a variety of input types and may be configured to be active (e.g., updated in real-time) or passive (e.g., statically displayed until changed by a user) in terms of information and/or objects displayed therein. Another advantage of the UCAM may be its compatibility with a variety of platforms. In this regard, a user may load the UCAM onto a plurality of his/her electronic devices such that the user may interact with all of the user's electronic devices in the same manner.

FIG. 3B is a diagram illustrating several exemplary configurations of a sectional user interface, in accordance with an embodiment of the invention. Referring to FIG. 3B, there is shown exemplary user interface configurations 306a, 306b, and 306c, each having a fixed region 310 comprising one or more fixed zones 311, a control region 314 comprising one or more control zones 315, and a content region 318 comprising one or more content zones 319. In this regard, the size, shape, and/or location of the fixed region 310, the control region 314, and the content region 318 may be configured based on user preferences and/or based on a function and/or application running on the electronic device 302.

FIG. 3C is a diagram illustrating several exemplary fixed regions of a sectional user interface, in accordance with an embodiment of the invention. Referring to FIG. 3C there is shown fixed regions 310a, 310b, and 310c. In this regard, each of the fixed regions 310a may comprise one or more objects 312. Additionally, the portion of the fixed region 310 allocated to each object 312 may be configured to be of any shape and/or size. Exemplary objects 312 may comprise text, images, links and/or icons which may correspond to the date, the time, weather information, appointments in a calendar, RSS or XML feeds, recent email contacts, and/or recent phone contacts.

FIG. 3D is a diagram illustrating several exemplary content regions of a sectional user interface, in accordance with an embodiment of the invention. In this regard, in various embodiments of the invention, a user may configure attributes of the content region 318 such as the number of objects displayed, the size of the objects displayed, and the order of objects displayed. For example, the content region 318 may be customized to have different attributes for each icon, each group of icons, and/or each user. Thus, to provide an indication of the types of information which may be displayed in the content region 318 as well as the customizability of the content region 318, exemplary content regions 318a, 318b, and 318c are depicted.

The content region 318a may correspond to an active icon which may, for example, be a folder or website comprising digital photographs. Consequently, the objects $320_1, \ldots, 320_4$ may correspond to the last four pictures uploaded to the folder or web site. The content region 318b may correspond to an active icon which may, for example, be a link to social networking website. Consequently, the objects $322_1, \ldots, 322_N$ may correspond to the last 'N' events which occurred on one or more profiles on the social networking site. In another example, the content region 318b may correspond to an active icon which may, for example, launch an email client and the objects $322_1, \ldots, 322_N$ may correspond to the last 'N' emails sent or received. The content region 318c may correspond to an active icon which may, for example, be a shortcut to launch a web browser. Consequently, the objects $324_1$ and $324_2$ may be links to favorite and/or recently visited web pages. In another embodiment, the MEMS sensing and processing module 104 may be operable to modify interaction with a user interface of the device being controlled 106 by activating one or more portions of the control region 314. For example, a user 102 may be enabled to control a speed of background auto-scrolling to scroll through options or menus in a mobile game on the device being controlled 106.

Figure 3E:
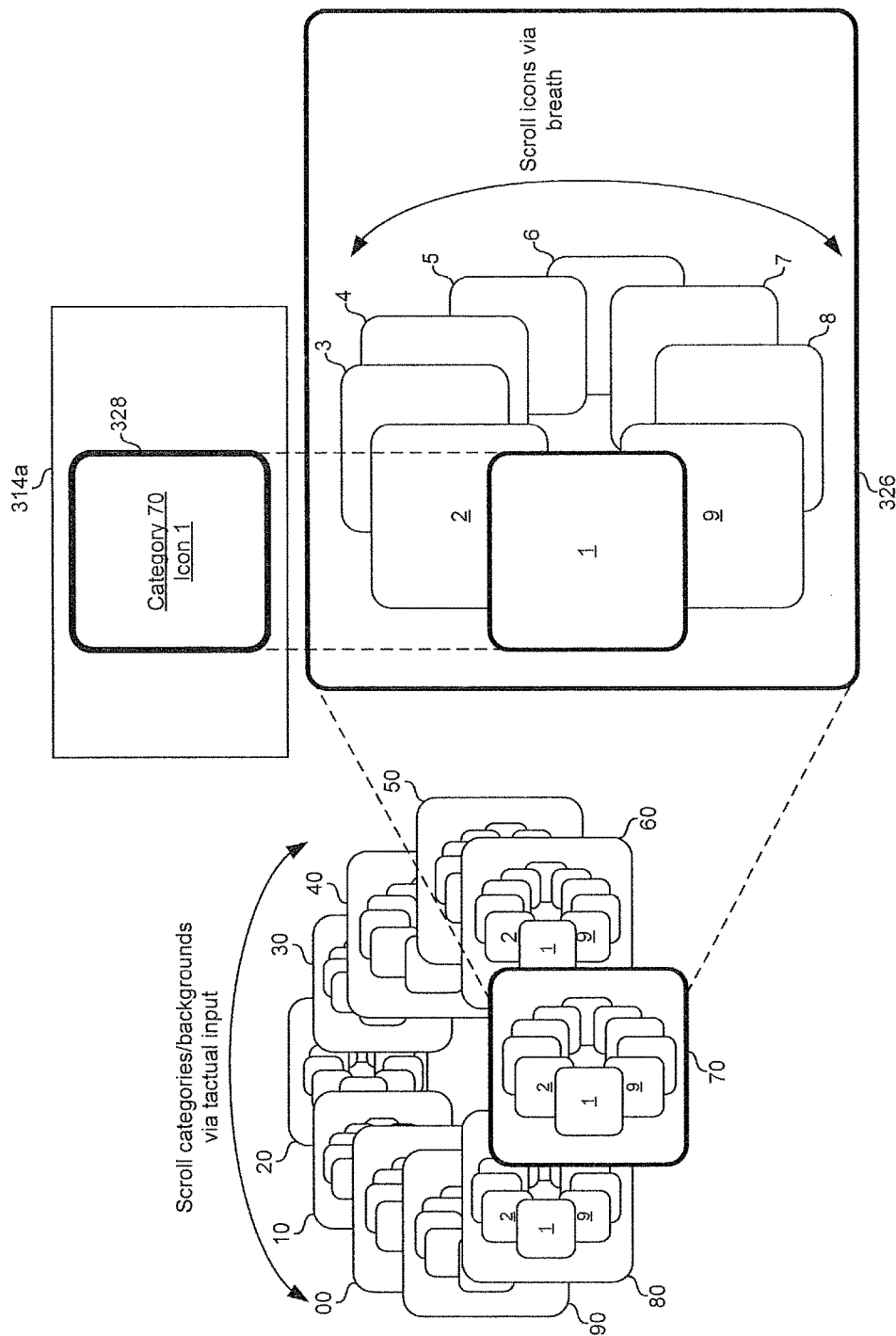
FIG. 3E illustrates interacting with a sectional user interface of an electronic device via respiratory and tactual input, in accordance with an embodiment of the invention.

FIG. 3E illustrates interacting with a sectional user interface of an electronic device via respiratory and tactual input, in accordance with an embodiment of the invention. Referring to FIG. 3E there is shown a control region 314a which may comprise an active icon area 328. The control region 314a depicted in FIG. 3E is an exemplary configuration of the control region 314 and the invention is not limited to the depicted embodiment. In various embodiments of the invention, icons may be represented in a variety of ways and may comprise visual information such as images and/or text and/or may comprise audio information such as tones, songs, and/or speech.

The active icon area 328 may determine, at least in part, the information displayed in a content region 318 as well as how an electronic device 302 may respond to a tactual and/or respiratory input. In this regard, a content region 318, as described with respect to FIGS. 3A and 3D, may display information corresponding to the icon that is in the active icon area 328. Furthermore, upon a "click", (e.g., a touch-screen tap, a button press or puff of air) an application or function associated with the icon in the active icon area 328 may be launched.

In various embodiments of the invention, icons may be grouped categorically and each category may comprise one or more icons. In this regard, the number of categories and/or the number of icons in each category may be configured by a user. In this regard, in the exemplary embodiment depicted in FIG. 3E, there are ten categories, categories 00, 10, . . . , 90, and each category comprises nine icons, icons 1, 2, . . . , 9. Exemplary categories may comprise phone and messaging, news, multimedia, music, photos, and videos. Additionally, information and/or objects displayed in the fixed zone 310 may be determined based on which category is active.

In various embodiments of the invention, each icon may comprise descriptive text, image(s) and/or audio, configurable by a user, to indicate which functions and/or applications may be associated with the icon.

In various embodiments of the invention, a background image, configurable by a user, of the display 304 may be associated with each category and may indicate which category is currently selected. In order to place a desired icon in the active icon area 328, a user may scroll between categories utilizing tactual and/or respiratory input and scroll between icons utilizing respiratory and/or tactual input. In this regard, the speed, direction, and/or duration of a scroll may be determined based on the type, duration, intensity, direction, and/or number of tactual and/or respiratory inputs.

In an exemplary embodiment of the invention, a user may scroll between categories utilizing tactual input and scroll between icons utilizing respiratory input. For example a user may scroll through the categories 00, 10, . . . , 90 by shifting the position of his thumb in the control region 314 or by rolling a trackball; and the user may scroll through the icons in the active category 326 by exhaling. A user may scroll though categories until a background image displayed on the electronic device 302 corresponds to a desired category. A user may scroll through icons until the icon in the active icon area 328 corresponds to a desired function and/or application and/or results in desired information and/or objects in the content area 318.

Figure 3F:
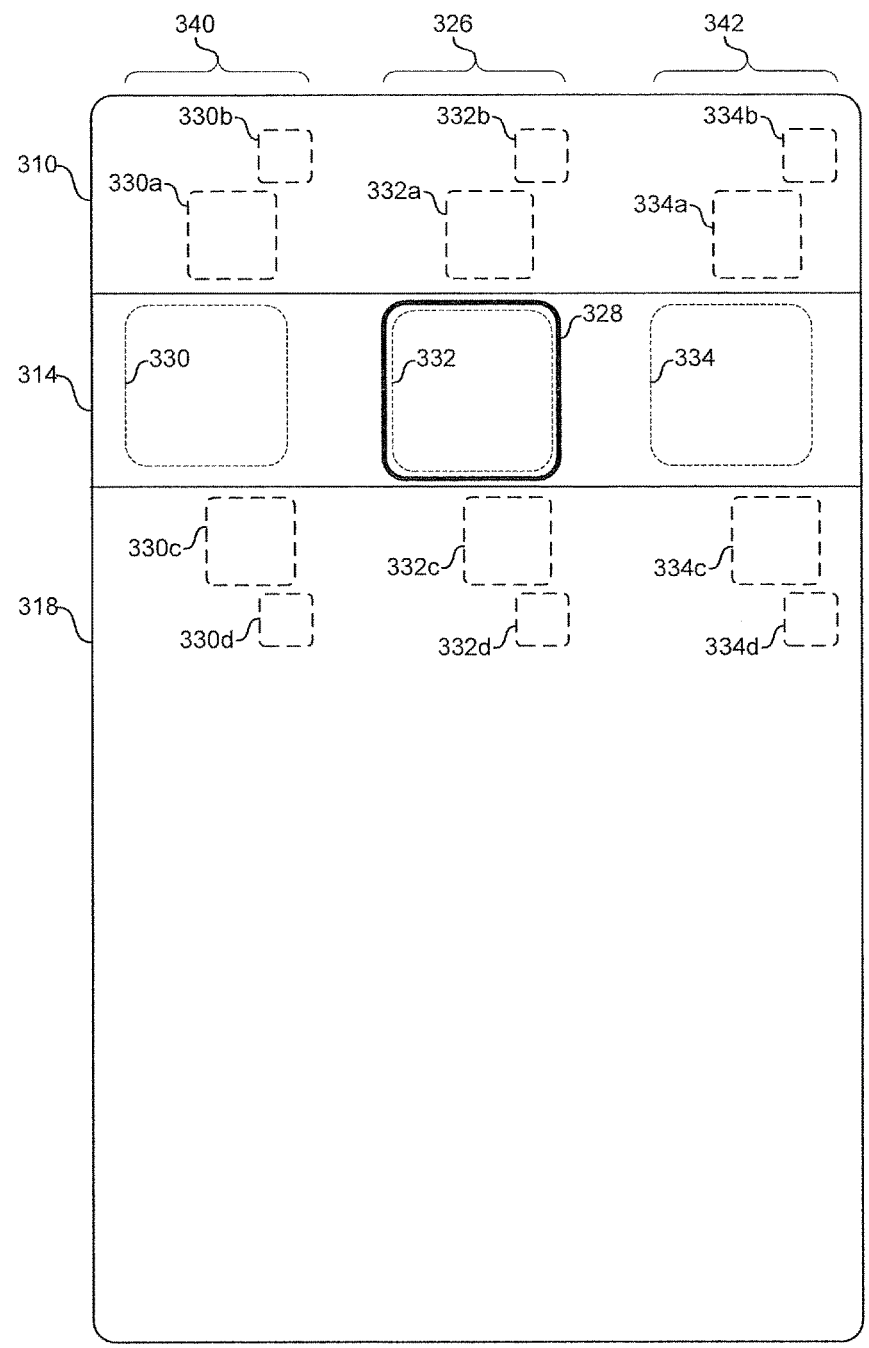
FIG. 3F illustrates an exemplary sectional user interface which may provide an indication of a sequence of categories and/or icons when scrolling, in accordance with an embodiment of the invention.

FIG. 3F illustrates an exemplary sectional user interface which may provide an indication of a sequence of categories and/or icons when scrolling. In this regard, the icons and/or categories may scroll in a linear manner in which there are first (e.g., leftmost or top) and last (e.g., rightmost or bottom) icons and/or categories. Alternatively, icons and/or categories may scroll in a cyclical manner in which all icons and/or categories may be accessed by scrolling in either direction regardless of which icon and/or category is active at the beginning of the scroll. Notwithstanding the manner in which icons and/or categories scroll, it may be desirable to provide a user with an indication of next and/or previous icons and/or categories in a scrolling sequence. Accordingly, various aspects of the invention may enable displaying an indication of next and/or previous icons and/or categories in the fixed region 310, the control region 314, and/or the content region 318. In this regard, the indication may enable a user to determine which direction to scroll icons and/or categories to reach a desired icon and/or category in a fastest and/or most efficient manner. For example, a portion(s) of the fixed region 310, the control region 314 and/or the content region 318 may be overlaid by semi-transparent image(s) of the next icon(s) and/or category/categories in the scrolling sequence. In this regard, the semi-transparency may be sufficiently opaque for a user to identify the next and/or previous icon(s) and/or category/categories and sufficiently transparent so that the information in the fixed region 310 and in the content region 318 may not be critically obstructed.

In the exemplary embodiment of the invention depicted in FIG. 3F, icons and categories may be scrolled in a "pinwheel" or "slot machine" fashion. In this regard, semi-transparent images of a two previous icon 330b, a one previous icon 330a, current icon 330, a one next icon 330c, and a two next icon 330d of a one previous category 340 may be overlaid on the user interface. Similarly, semi-transparent images of a two previous icon 332b, a one previous icon 332a, current icon 332, a one next icon 332c, and a two next icon 332d of the active category 326 may be overlaid on the user interface. Similarly, semi-transparent images of a two previous icon 334b, a one previous icon 334a, current icon 334, a one next icon 334c, and a two next icon 334d of a one next category 342 may be overlaid on the user interface.

Figure 3G:
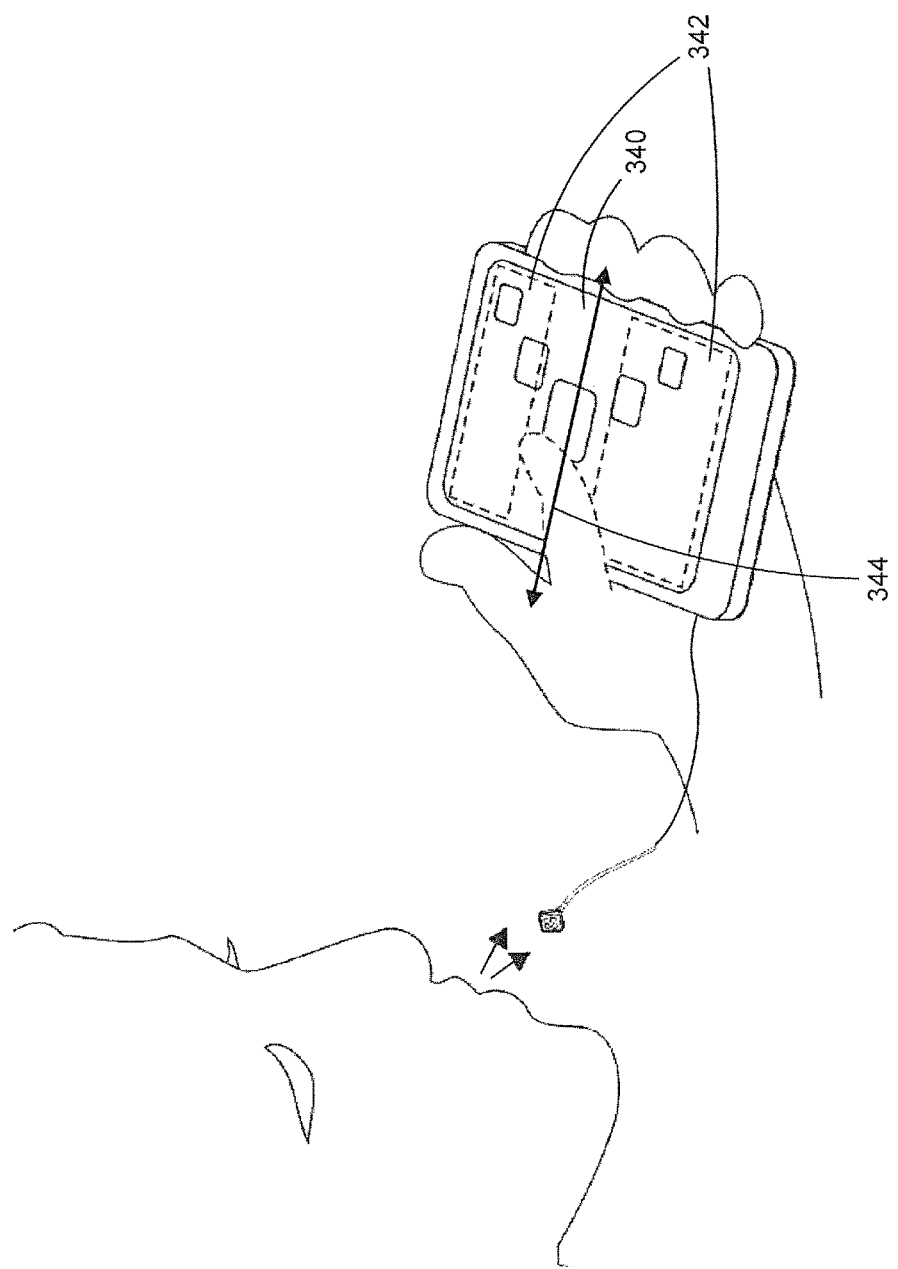
FIG. 3G illustrates interacting with an exemplary sectional user interface via respiratory and tactual input, in accordance with an embodiment of the invention.

FIG. 3G illustrates interacting with an exemplary sectional user interface via respiratory and tactual input, in accordance with an embodiment of the invention. Referring to FIG. 3G there is shown a user interacting with an exemplary sectional user interface via tactual and respiratory input.

The region 340 of the user interface may be a control region and may display elements which may be displaced by respiratory input and selected by a thumb tap in the region 340. The arrow 344 in FIG. 3G is utilized to illustrate that categories of icons may be scrolled via thumb shifting (i.e. a slight drag of the thumb) in the region 340.

Information and/or objects displayed in the regions 342 may be superimposed transparencies that allow a user to see the previews of the next and previous icons. The information and/or objects displayed in the regions 342 may be fixed or may change and/or update. Some objects displayed in the regions 342 may be selectable via a thumb tap.

Thus, due to the combination of respiratory and tactual inputs and the clearly defined responses to those inputs, the sectional user interface comprising the regions 340 and 342 may provide a disambiguated solution compared to conventional user interfaces. In this regard, the sectional user interface may enable configurable (i.e. customized or personalized) and predictable control of an electronic device and multi-layered and/or multi-dimensional display of content.

Figure 3H:
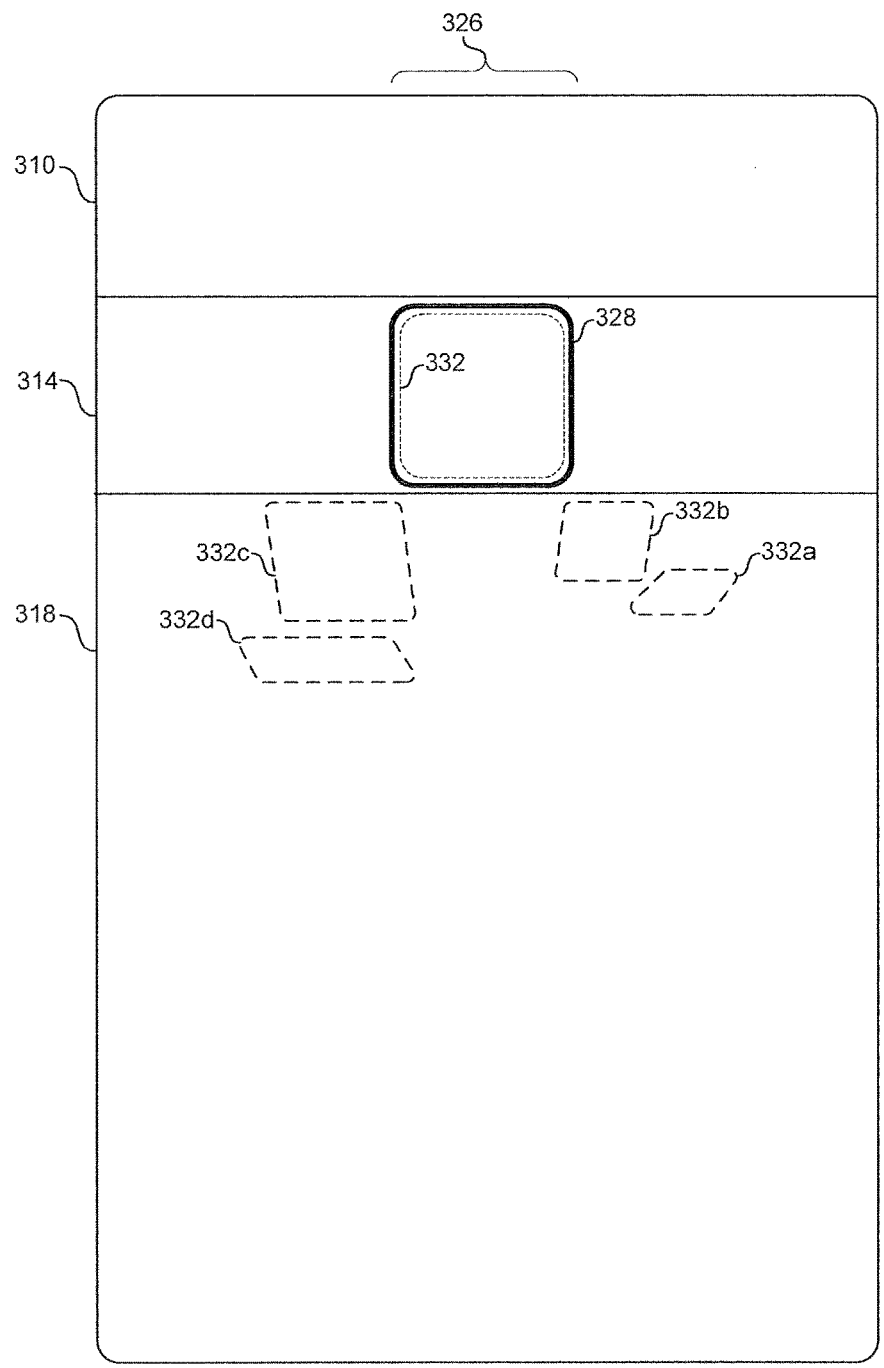
FIG. 3H illustrates another exemplary sectional user interface which may provide an indication of a sequence of categories and/or icons when scrolling, in accordance with an embodiment of the invention.

FIG. 3H illustrates another exemplary sectional user interface which may provide an indication of a sequence of categories and/or icons when scrolling. In the exemplary embodiment of the invention depicted in FIG. 3H, icons and categories may be scrolled in a "flipbook" fashion. In this regard, semi-transparent images of a two previous icon 332b, a one previous icon 332a, current icon 332, a one next icon 332c, and a two next icon 332d of the active category 326 may be overlaid on the user interface.

Figure 4A:
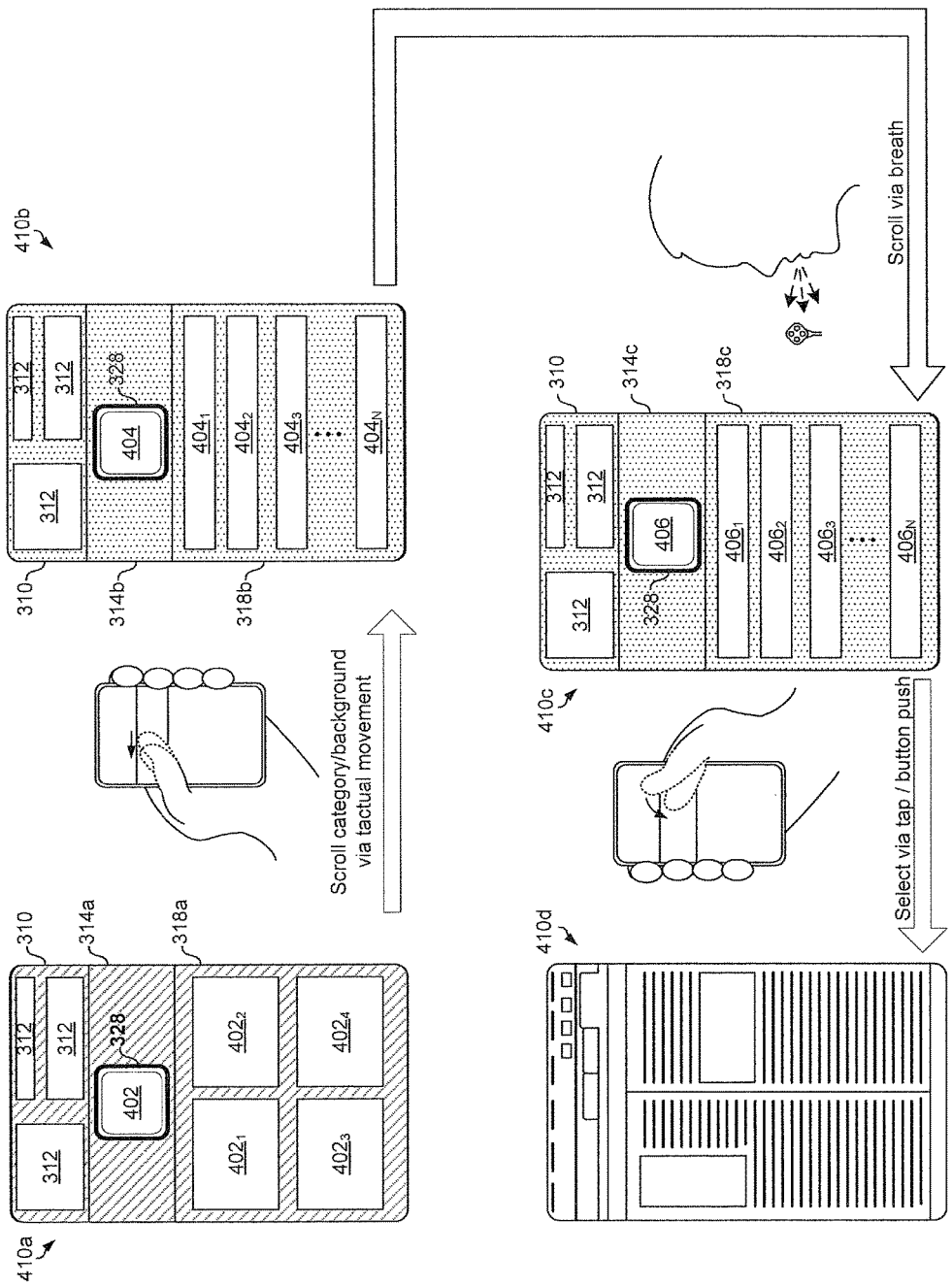
FIG. 4A illustrates launching an application via a user interface utilizing respiratory and tactual input, in accordance with an embodiment of the invention.

FIG. 4A illustrates launching an application via a user interface utilizing tactual and respiratory input, in accordance with an embodiment of the invention. Referring to FIG. 4A there is shown exemplary screen shots 410a, 410b, 410c, and 410d which depict an exemplary sequence of actions to navigate to a desired icon and launch an application associated with that icon.

The sequence of actions may begin with the electronic device 302 in the state depicted by screenshot 410a. In this regard, in screenshot 410a, an icon 402 may be in the active icon area 328 of the control region 314a. Accordingly, the background image of diagonal stripes may correspond to the category to which the icon 402 may belong. Additionally, the objects $402_1, \ldots, 402_4$ in the content region 318a may correspond to the icon 402.

Subsequently, a user may scroll through a sequence of categories via a tactual movement such as a thumb shift or a roll of a trackball. In this regard, the user may seek a category associated with a background image of dots. Accordingly, when the user arrives at the background image of dots the device may be in the state depicted in screenshot 410b. In the screenshot 410b, an icon 404 may be in the active icon area 328 of the control region 314b and the objects $404_1, \ldots, 404_N$ in the content region 318b may correspond to the icon 404.

Subsequently, a user may scroll through the icons in the category with the background image of dots via a respiratory input such as one or more exhalations. In this regard, the user may scroll through a sequence of icons until the device is in the state depicted in the screenshot 410c. In the screenshot 410c, an icon 406, corresponding to a desired function or application, may be in the active icon area 328 of the control region 314c. Accordingly, the objects $406_1, \ldots, 406_N$ in the content region 418c may correspond to the icon 406.

In this manner, in the screenshot 410c, the user may have arrived at his desired icon, icon 406, and may launch the desired application and/or function by selecting the icon 406 via a tactual input such as a tap of a touchscreen or a button press. In the exemplary embodiment of the invention depicted in FIG. 4A, 410d, a web page may be associated with the icon 406 and upon selecting the icon 406, a web browser may launch and a web page may be displayed full-screen as depicted in the screenshot 410d.

Figure 4B:
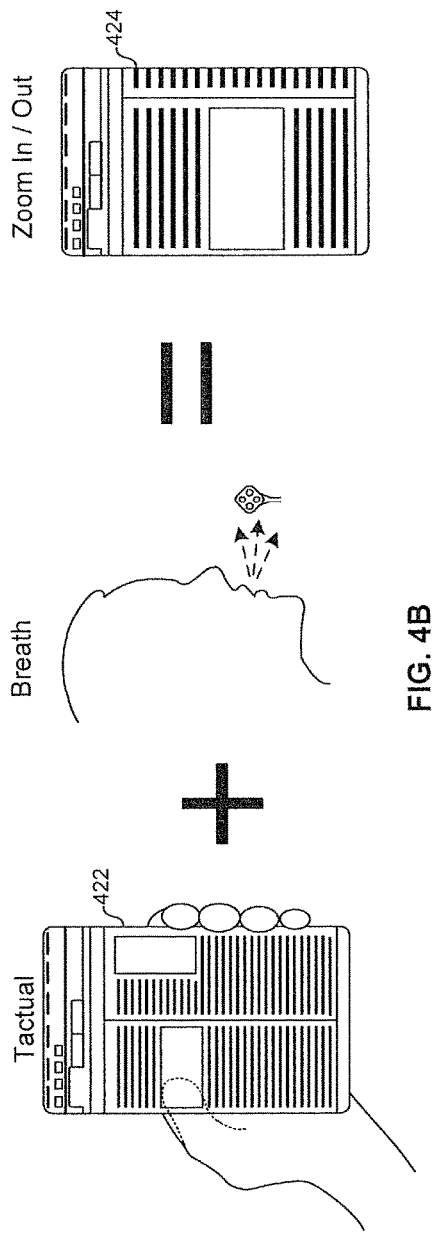
FIG. 4B illustrates exemplary interaction with an application running on an electronic device, in accordance with an embodiment of the invention.

FIG. 4B illustrates exemplary interaction with an application running on a electronic device, in accordance with an embodiment of the invention. Referring to FIG. 4B, aspects of the invention may enable zooming in (enlarging) and/or zooming out (shrinking) via a combination of respiratory and tactual inputs. For example, a web browser running on the electronic device 302 may be displaying a full webpage 422 and a user may wish to zoom in on a portion 424 of the webpage. Accordingly, the user may utilize a tactual input to control a reference point(s) for the zoom and utilize a respiratory input to control the direction and/or amount of zoom. For example, the user may touch the reference point on a touchscreen and may zoom in or out based on that reference point by exhaling. In this regard, the direction and/or amount of zoom may be controlled by, for example, the intensity, duration, direction, and/or number of exhalations.

Figure 4C:
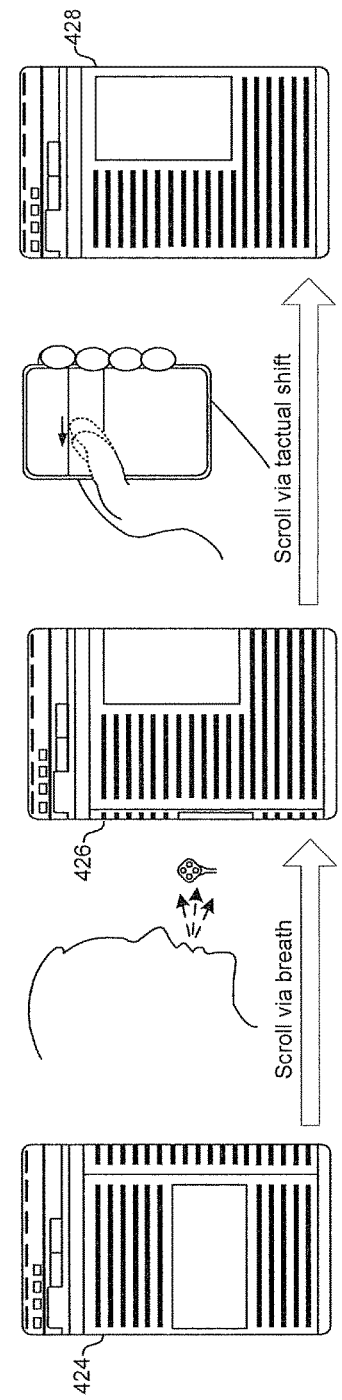
FIG. 4C illustrates exemplary interaction with an application running on an electronic device, in accordance with an embodiment of the invention.

FIG. 4C illustrates interaction with an application running on an electronic device, in accordance with an embodiment of the invention. Referring to FIG. 4C, aspects of the invention may enable scrolling via a combination of respiratory and tactual inputs. Exemplary applications may comprise a web browser, a media player, a still camera, a video camera, and a file system browser. For example, a web browser may be displaying a portion of a webpage 424 and a user may wish to scroll to another portion 428 of the webpage. Accordingly, the user may utilize a respiratory input to perform a coarse scroll and utilize a tactual input to perform a fine scroll. For example, the user may exhale in the direction he wishes to scroll to arrive at the portion 426 of the webpage and then finely adjust the position of the webpage via a roll of a trackball such that the portion 428 of the webpage is displayed.

FIG. 5 is a block diagram of an exemplary user interface interacting with a MEMS sensing and processing module and a host system, in accordance with an embodiment of the invention. Referring to FIG. 5, there is shown a device being controlled 106. The device being controlled 106 may comprise a communication module 502, a user interface 504 and a host interface 506, a plurality of drivers and/or libraries 506, 518, 520 and 522 and a plurality of applets 508, 510, 512 and 514. The user interface 504 may be a graphical user interface (GUI), for example.

The communication module 502 may comprise suitable logic, circuitry, interfaces, and/or code that may be operable to receive one or more signals from the MEMS sensing and processing module 104 operable to function as a driver, and/or an interface such as a human interface device (HID). For example, if the received signal is not compliant with a supported HID profile, that is, the signal is not a supported HID class, then the received signal may be passed to a driver such as a custom expulsion of air driver or an air detection driver for processing on the device being controlled 106. The received signal may be processed in the device being controlled 106 using the driver. The one or more signals may be generated in response to detection of movement of air caused by the expulsion of human breath by user 102. The communication module 502 may be operable to receive one or more signals from the MEMS sensing and processing module 104 via a wired and/or a wireless signal. The communication module 502 may support a plurality of drivers, interfaces and/or HID profiles. For example, the communication module 120 may support an external memory interface, a universal asynchronous receiver transmitter (UART) interface, an enhanced serial peripheral interface (eSPI), a general purpose input/output (GPIO) interface, a pulse-code modulation (PCM) and/or an inter-IC sound ($I^2S$) interface, an inter-integrated circuit ($I^2C$) bus interface, a universal serial bus (USB) interface and/or HID profile, a Bluetooth interface and/or HID profile, a ZigBee interface and/or HID profile, an IrDA interface and/or HID profile, and/or a wireless USB (W-USB) interface and/or a HID profile.

The user 102 may be enabled to interface with the GUI 504 of the device being controlled 106 via the one or more received signals. The received one or more signals may be compliant with one or more drivers, a universal serial bus (USB) HID class and/or a wireless protocol HID class, such as wireless USB HID class and/or a ZigBee HID class, for example. Notwithstanding, the invention may not be so limited and one or more drivers and/or other wireless protocol HID classes may be utilized without limiting the scope of the invention. Currently, Bluetooth utilizes the USB HID class. Furthermore, if the received signal is not compliant with a supported HID profile, that is, the signal is not a supported HID class, then the received signal may be passed to a driver such as a custom expulsion of air driver or an air detection driver for processing on the device being controlled 106. The received signal may be processed in the device being controlled 106 using the driver.

The communication module 502 may be operable to format the received one or more signals into a HID profile. The HID profile may comprise one or more drivers and/or libraries 516-522 that may enable interfacing with the GUI 504 of the device being controlled 106. The one or more drivers and/or libraries 516-522 may enable one or more of initiation, establishment and/or termination of communication by the device being controlled 106 with the MEMS sensing and processing module 104. The HID profile may define protocols, procedures, and/or usage scenarios for using the HID, such as the MEMS sensing and processing module 104 over a wired and/or wireless link, such as Bluetooth. The device being controlled 106 may host a wireless protocol stack, such as the Bluetooth stack which may use the Service Discovery Protocol (SDP) to discover HIDs, such as the MEMS sensing and processing module 104.

The user interface of one of more of the devices being controlled 106 may also be activated and modified based on button or key-activated function modes. The function modes may comprise portions of firmware embedded in the MEMS sensing and processing module 104 and one or more applications, drivers, and/or libraries installed on the device being controlled 106. The function modes may be activated from the MEMS sensing and processing module 104, and/or via one or more stimuli on the device being controlled 106. The one or more stimuli may comprise puff of air, touch, audio, visual, gestures, and/or other stimuli.

In accordance with an embodiment of the invention, the device being controlled 106 may be operable to receive from the HID, such as the MEMS sensing and processing module 104 before it is activated, device information, such as descriptors to the class drivers and/or libraries 516-522. The drivers and/or libraries 516-522 may be operable to utilize the descriptors to determine device characteristics in order to enable controls on the device being controlled 106.

For example, the library, variable #1 516 may be operable to detect the direction of expulsion of human breath onto the HID, such as the MEMS sensing and processing module 104 and accordingly convert the received signal into a directional signal that controls one or more components of the user interface 504. The library, momentum #1 518 may be operable to detect a puff of air exhaled by the user 102, and accordingly utilize the corresponding received signal from the MEMS sensing and processing module 104 to scroll through one or more menus of the user interface 504 and slow down after a particular period of time. For example, the library, momentum #1 518 may be operable to detect a repeated number of puffs of human breath within a certain time, or a combination of directional puffs of human breath within a certain time, or a fast left-right-left sequence of a puff of human breath exhaled by the user 102, and generate a control signal to activate and/or switch through a user interface of the device being controlled 106. For example, by blowing a puff of air on the MEMS sensing and processing module 104, a direction and speed of scrolling may be determined based on the flow of air across the surface of the MEMS sensing and processing module 104 from left-bottom to right-top. The MEMS sensing and processing module 104 may generate a control signal that may result in a corresponding two-axis scrolling of a user interface, and the speed of scrolling may be determined based on the duration of sensing the flow of air or the intensity of pressure of the flow of air on the MEMS sensing and processing module 104. In another embodiment, one or more fixed puffs of air at the MEMS sensing and processing module 104 within a certain period of time after scrolling interaction may be processed as a zoom function mode that may enable zooming in into an area visible as a result of scrolling. The user 102 may be enabled to end the zoom function mode by puffing air again at the MEMS sensing and processing module 104 and returning back to the scroll function mode.

The library, Boolean #1 520 may be operable to utilize the received signal from the MEMS sensing and processing module 104 to select one or more menus and/or icons within the user interface 504. The library, Boolean #2 522 may also be operable to utilize the received signal from the MEMS sensing and processing module 104 to select one or more menus and/or icons within the user interface 504. The library, Boolean #2 522 may also be operable to determine a function mode based on a received sequence of puffs of human breath within a particular period of time. For example, a number of puffs of human breath received within a certain period of time may switch a function mode from a scrolling function mode to a magnifying function mode within the user interface 504. Notwithstanding, the invention may not be so limited and other driver and/or libraries may be utilized without limiting the scope of the invention.

The device being controlled 106 may be operable to interface with the detection device, such as the MEMS sensing and processing module 104 utilizing one or more applets 508-514. The applets 508-514 may comprise software components, code and/or programs that may be operable to run in context of another program, such as a web browser, for example. For example, the applet, UI skin #1 508 may comprise a software component, code and/or program that may function as a pinwheel, where a plurality of icons may cycle through the background of the user interface 504. The user 102 may be prompted to select one or more icons from the background of the user interface 504 of the device being controlled 106. The applet, UI skin #2 510 may comprise a software component, code and/or program that may enable dissolving one or more icons on the user interface 504 into dust, for example, when a user 102 blows air at the icons being displayed on the GUI 504. In another embodiment, one of the applets may comprise a software component, code and/or program that may switch between one or more components of the user interface 504 upon activation, for example.

In another embodiment, one of the applets may comprise a software component, code and/or program that may function as a 3-D flipbook, where a user 102 may be enabled to blow air at a book on the GUI 504 to turn one or more pages within the book. The applet, Faves #1 512 may comprise a software component, code and/or program that may enable morphing two or more pictures of users or friends on the GUI 504 into a single picture, when a user 102 blows air onto the two or more pictures of users or friends on the GUI 504. The applet, Scroll Function 514 may comprise a software component, code and/or program that may enable scrolling through a plurality of menus, pages and/or icons on the GUI 504. The GUI 504 of the device being controlled 106 may be operable to interface with the MEMS sensing and processing module 104 based on one or more outputs generated by the applets 508-514.

The host computer interface (HCI) 506 may comprise an interface to a display, other hardware and/or processors within the device being controlled 106 for controller management, link establishment, and/or maintenance, for example. A HCI transport layer may be operable to deliver HCI commands to the other hardware within the device being controlled 106.

In accordance with an embodiment of the invention, the MEMS sensing and processing module 104 may be utilized to enable a plurality of function modes on the device being controlled 106. For example, the MEMS sensing and processing module 104 may be operable to enable a scroll function mode to enable scrolling through a document in a multi-dimensional axis, a zoom function mode to enable zooming in and zooming out of a document or enable directional magnification, displace a cursor in a body of text, a point and click function mode, where clicks may be an exemplary embodiment of puffing air one or more times on the MEMS sensing and processing module 104, a drag and drop function mode to enable dragging an item on the user interface 128 by pausing a pointer on the item, dragging the item and then dropping the item by puffing air again on the MEMS sensing and processing module 104.

For example, the MEMS sensing and processing module 104 may be operable to move a character and/or avatar in games and other multimedia applications, in one or more dimensions, displace a background by controlling an auto-scroll speed or displace other superimposed elements in games and other applications, scroll and select through a list of options with no interruption of gameplay, swap weapons while shooting in games, and/or add customizable inputs to existing controllers in games based on mapping specific controls to be operated by breath to enable more simultaneous inputs. For example, the MEMS sensing and processing module 104 may be operable to enable multimodal input with a keyboard, a mouse, or any other input device, enable multimodal input with a touchscreen, enable multimodal input with voice and/or speech for GUI-based interaction, such as, motion of virtual elements, and/or enable multimodal input with gesture and/or motion tracking.

In accordance with another embodiment of the invention, the MEMS sensing and processing module 104 may be operable to enable control of non-GUI variable functions, such as setting an audio level or volume, skipping tracks, forward or backward in an audio-video device, and/or skipping voicemail messages in a phone, browse through icons, applications, windows, or widgets while entering data, and/or interact with a navigation system, or in-vehicle dashboard and entertainment system with a user's hands on the steering wheel as illustrated in FIG. 2F.

In accordance with another embodiment of the invention, the MEMS sensing and processing module 104 may be operable to enable mimicking real-life interactions such as blowing fire, a candle, a pinwheel, soap bubbles, or a waft of dust in virtual reality environments and games, modify audio and/or video parameters while playing music, such as filters, pitch, or source. For example, the MEMS sensing and processing module 104 may be operable to enable hands-free operation of wearable equipment in enterprise, law enforcement, homeland security, medical emergency, military operations by enabling function modes, such as scroll or zoom content in a head mounted display as disclosed in FIG. 2D, remotely interact with a large display or a video projector, and/or control a toy or electronic device by adjusting the direction of motion, and/or speed, set parameters such as line width in graphics design editing applications, while drawing or providing other input, for example.

Notwithstanding, the invention may not be so limited and the MEMS sensing and processing module may be utilized in other applications without limiting the scope of the invention.

In accordance with an embodiment of the invention, the human or user 102 interfacing with the GUI 504 may be agnostic to any particular operating system (OS) platform on the device being controlled 106. For example, the device being controlled 106 may be running on any one or more of a Windows OS, Symbian OS, Android OS, Palm OS, or other operating systems on mobile phones such as the iPhone or a Blackberry phone. Notwithstanding, the invention may not be so limited and other operating systems may be utilized without limiting the scope of the invention.

Figure 6:
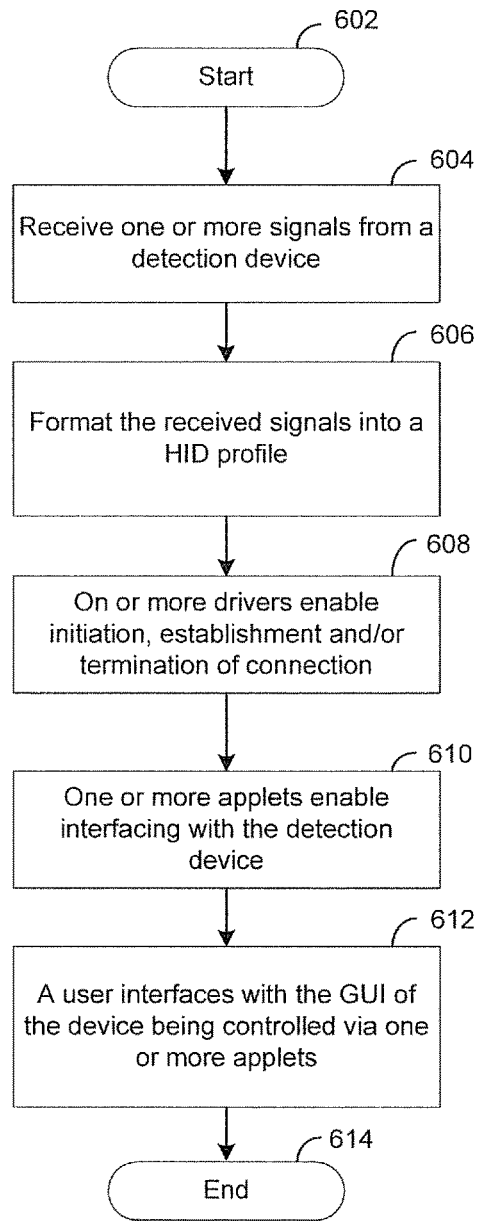
FIG. 6 is a flowchart illustrating exemplary steps for processing signals that control a device using human breath.

FIG. 6 is a flowchart illustrating exemplary steps for processing signals that control a device using human breath. Referring to FIG. 6, exemplary steps may begin at step 602. In step 604, one or more signals may be received from a detection device, operable to function as a human interface device (HID) such as the MEMS sensing and processing module 104. The detection device may comprise a micro-electro-mechanical system (MEMS) detector that may be embedded in a device to be controlled. The one or more signals may be generated in response to detection of movement of air caused by the expulsion of human breath. In step 606, the device being controlled 106 may be operable to format the received one or more signals into a HID profile. The HID profile may comprise one or more drivers and/or libraries 516-522 that may enable interfacing with the GUI 504 of the device being controlled 106. In step 608, the one or more drivers and/or libraries 516-522 may enable one or more of initiation, establishment and/or termination of communication by the device being controlled 106 with the MEMS sensing and processing module 104. In step 610, one or more applets 508-514 within the device being controlled 106 may be operable to interface with the detection device, such as the MEMS sensing and processing module 104. In step 612, the user 102 may be enabled to interface with a graphical user interface (GUI) 128 of the device being controlled 106 via the one or more received signals utilizing one or more applets 508-514. Control then passes to end step 514.

Figure 7A:
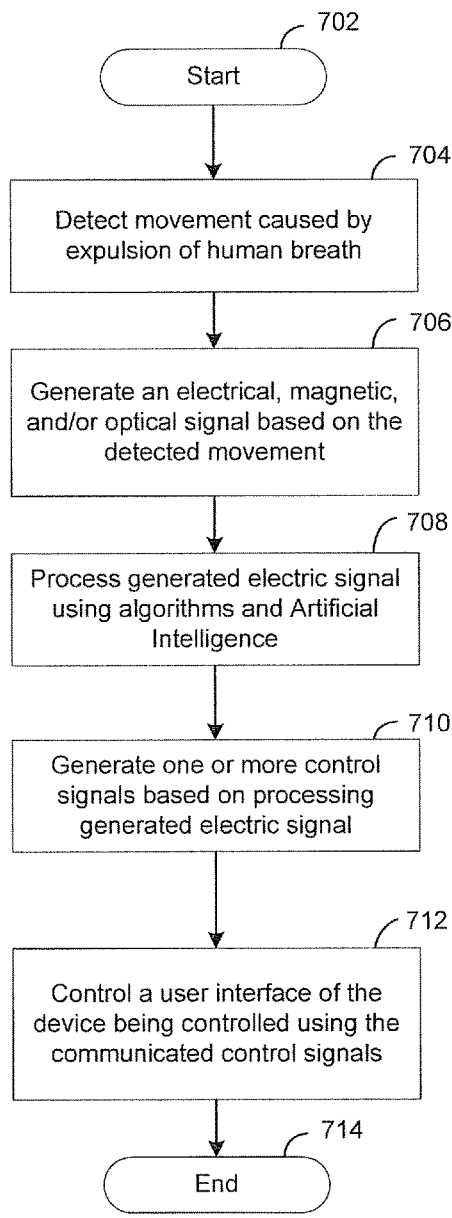
FIG. 7A is a flow chart illustrating exemplary steps for controlling a user interface of a device using human breath, in accordance with an embodiment of the invention.

FIG. 7A is a flow chart illustrating exemplary steps for controlling a user interface of a device using human breath, in accordance with an embodiment of the invention. Referring to FIG. 7A, exemplary steps may begin at step 702. In step 704, the sensing module 110 in the MEMS sensing and processing module 104 may be operable to detect movement or change in composition such as ambient air composition, for example caused by the expulsion of human breath by the user 102. In step 306, the sensing module 110 may be operable to generate one or more electrical, optical and/or magnetic signals in response to the detection of movement caused by the expulsion of human breath. In step 708, the processor firmware 116 may be operable to process the received electrical, magnetic and/or optical signals from the sensing module 110 utilizing various algorithms. The processor firmware 116 may also be operable to incorporate artificial intelligence (AI) algorithms to adapt to a particular user's 102 breathing pattern.

In step 710, the processor firmware 116 may be operable to generate one or more control signals to the device being controlled 106 based on processing the received electrical, optical and/or magnetic signals from the sensing module 110. In step 712, the generated one or more control signals may be operable to control a user interface 128 of the device being controlled 106, such as a user interface 107a of the multimedia device 106a, a user interface 107b of the cellphone/smartphone/dataphone 106b, a user interface 107c of the personal computer (PC), laptop or a notebook computer 106c, a user interface 107d of the display device 106d, a user interface 107e of the TV/game console/other platform 106e, and a user interface of a mobile multimedia player and/or a remote controller. Control then passes to end step 714.

Figure 7B:
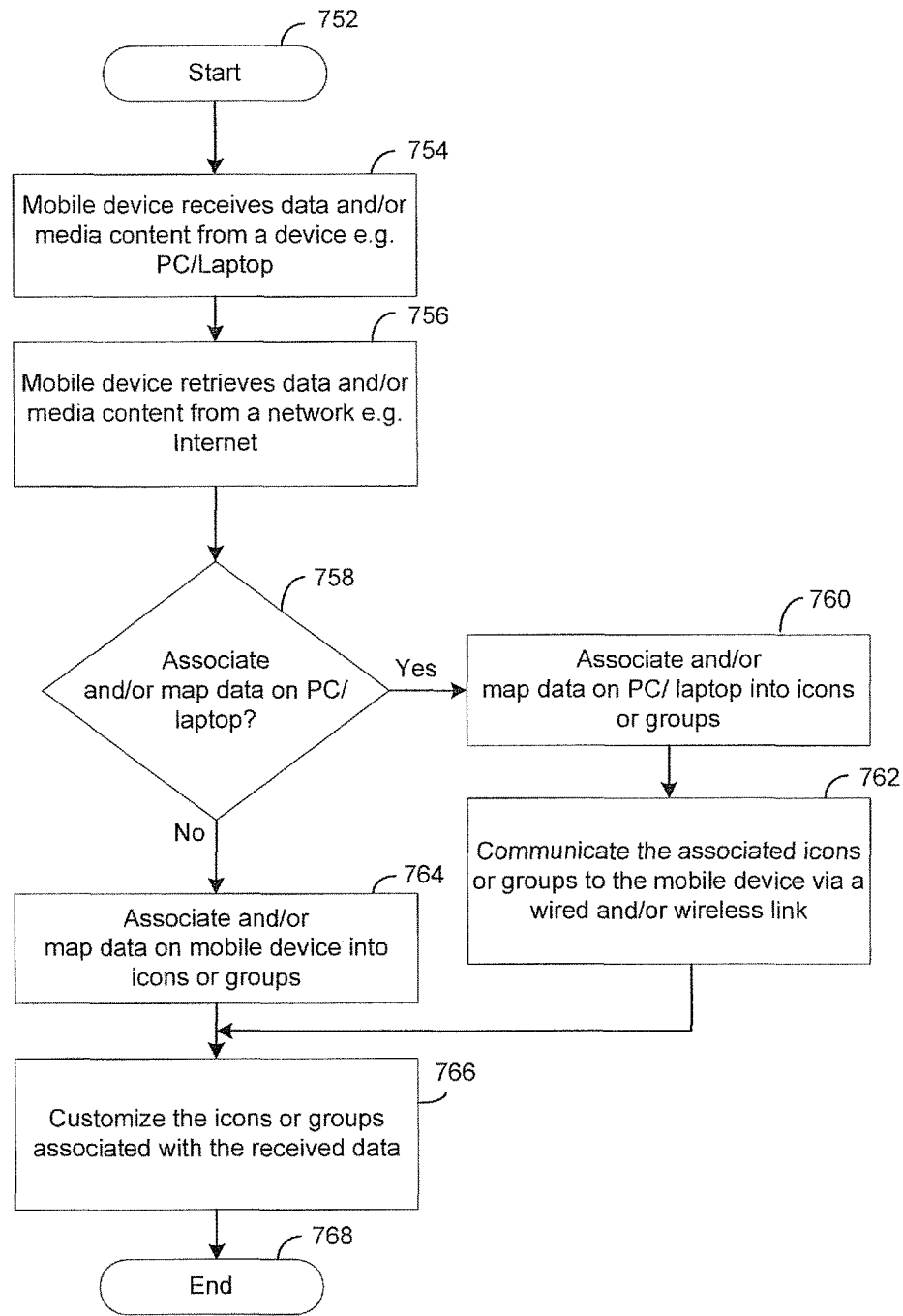
FIG. 7B is a flow chart illustrating exemplary steps for side loading of information, in accordance with an embodiment of the invention.

FIG. 7B is a flow chart illustrating exemplary steps for side loading of information, in accordance with an embodiment of the invention. Referring to FIG. 7B, exemplary steps may begin at step 752. In step 754, the device being controlled 106, such as the mobile phone 130a may be operable to receive data and/or media content from another device 108, such as the PC, laptop, or a notebook computer 132. In step 756, the device being controlled 106, such as the mobile phone 130a may be operable to retrieve data and/or media content from a network, such as the Internet 134. For example, the retrieved data and/or media content may comprise an RSS feed, a URL and/or multimedia content.

In step 758, it may be determined whether the laptop, PC and/or notebook 132 may perform association and/or mapping of the received data and/or media content and the retrieved data and/or media content. If the association or mapping is performed on the laptop, PC and/or notebook 132, control passes to step 760. In step 760, one or more processors within the laptop, PC and/or notebook 132 may be operable to associate and/or map the received and retrieved data and/or media content into icons or groups. For example, the laptop, PC and/or notebook 132 may be operable to associate and/or map an icon to a function so that the user 102 may enable or activate a function via the icon. Exemplary icons may enable functions such as hyper-links, book marks, shortcuts, widgets, RSS feeds and/or favorite buddies. In step 762, the laptop, PC and/or notebook 132 may be operable to communicate the associated icons or groups to the device being controlled 106, such as the mobile phone 130a. Control then passes to step 766.

If the association or mapping is not performed on the laptop, PC and/or notebook 132, control passes to step 764.

In step 764, one or more processors within the device being controlled 106, such as the mobile phone 130a may be operable to associate and/or map the received and retrieved data and/or media content into icons or groups. For example, the mobile phone 130a may be operable to associate and/or map an icon to a function so that the user 102 may enable or activate a function via the icon.

In step 766, the device being controlled 106, such as the mobile phone 130a may be operable to customize the associated icons or groups so that content associated with the received data and/or media content may become an integral part of the user interface 131a of the device being controlled, such as the mobile phone 130a. The user interface 131a may be modified and/or organized by the user 102. In this regard, the user 102 may choose, create, arrange and/or organize content to be utilized for the user interface 131a and/or one or more content components. For example, the user 102 may organize the content components on a screen and may choose content such as personal photographs for background and/or icon images. In addition, the user 102 may create and/or modify the way content components are activated or presented to the user 102. For example, the user 102 may make, import and/or edit icons and/or backgrounds for the user interface 128. Control then passes to end step 768.

In accordance with an embodiment of the invention, a method and system for controlling a user interface of a device using human breath may comprise a device 106 (FIG. 1A) comprising an embedded micro-electro-mechanical system (MEMS) sensing and processing module 104 (FIG. 1A). The MEMS sensing and processing module 104 may be operable to detect movement caused by the expulsion of human breath by the user 102. In response to the detection of movement caused by the expulsion of human breath, the MEMS sensing and processing module 104 may be operable to generate one or more controls signals. The generated one or more control signals may be utilized to control a user interface 128 of the device 106, such as a multimedia device 106a, a cellphone/smartphone/dataphone 106b, a PC, laptop or a notebook computer 106c, a display device 106d, a TV/game console/other platform 106e, a mobile multimedia player and/or a remote controller.

In an exemplary embodiment of the invention, the detection of the movement caused by the expulsion of human breath may occur without use of a channel. The detection of the movement caused by expulsion of human breath may be responsive to the human breath being exhaled into open space and onto one or more detectors in the MEMS sensing and processing module 104 that enables the detection.

In accordance with another embodiment of the invention, the MEMS sensing and processing module 104 may be operable to navigate within the user interface of one of more of the devices being controlled 106 via the generated one or more control signals. The MEMS sensing and processing module 104 may be operable to select one or more components within the user interface 128 of the devices being controlled 106 via the generated one or more control signals. The generated one or more control signals may be communicated to the device being controlled via one or more of an external memory interface, a universal asynchronous receiver transmitter (UART) interface, an enhanced serial peripheral interface (eSPI), a general purpose input/output (GPIO) interface, a pulse-code modulation (PCM) and/or an inter-IC sound ($I^2S$) interface, an inter-integrated circuit ($I^2C$) bus interface, a universal serial bus (USB) interface, a Bluetooth interface, a ZigBee interface, an IrDA interface, and/or a wireless USB (W-USB) interface.

The MEMS sensing and processing module 104 may be operable to enable one or more of initiation, establishment and/or termination of communication by the device 106. The MEMS sensing and processing module 104 may be operable to enable interaction within the user interface 128 of the device being controlled 106 based on one or more of the expulsion of human breath or expulsion of a fluid such as air, tactual inputs such as button presses, audio inputs such as voice commands, and/or movements of the device being controlled 106 such as those detected by an accelerometer and/or a gyroscope.

In accordance with another embodiment of the invention, the MEMS sensing and processing module 104 may be operable to generate control signals to control one or more analog and/or digital functions within the user interface 128 of one of more of the devices being controlled 106. The MEMS sensing and processing module 104 may be operable to omni-directionally detect puffs of air at ultra low pressure. The MEMS sensing and processing module 104 may be operable to allow intuitive function modes, such as, a scroll, pan, zoom, and/or click function modes, prevent unintentional selection of content, and/or minimize occlusion of content.

One or more of the plurality of devices, such as a handheld device, for example, a multimedia device 106a and/or a cellphone/smartphone/dataphone 106b and/or a PC, laptop or a notebook computer 106c may be operable to receive one or more inputs defining the user interface 128 from another device 108. The other device 108 may be one or more of a PC, laptop or a notebook computer 106c and/or a handheld device, for example, a multimedia device 106a and/or a cellphone/smartphone/dataphone 106b. In this regard, data may be transferred from the other device 108 to the cellphone/smartphone/dataphone 106b and this data may be associated or mapped to media content that may be remotely accessed by the cellphone/smartphone/dataphone 106b via a service provider such as a cellular or PCS service provider. The transferred data that is associated or mapped to media content may be utilized to customize the user interface of the cellphone/smartphone/dataphone 106b. In this regard, media content associated with one or more received inputs may become an integral part of the user interface 128 of the device being controlled 106.

The invention is not limited to the expulsion of breath. Accordingly, in various exemplary embodiments of the invention, the MEMS may be operable to detect the expulsion of any type of fluid such as air, and the source of the fluid may be an animal, a machine and/or a device.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for controlling a user interface of a device using human breath.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for interaction, the method comprising:
    in a device comprising an embedded micro-electro-mechanical system (MEMS) sensing and processing module:
        detecting movement of each of a plurality of independently movable segments of said MEMS sensing and processing module, said movement caused by flow of human breath expelled by a user upon said plurality of movable segments;
        responsive to said detection, said MEMS sensing and processing module generating one or more control signals representative of a respiratory type of input from said user to control a graphical user interface of a touch sensitive display of said device;
        receiving a tactual type of input resulting from contact of said user with said touch sensitive display;
        displaying within a first geometric region of said touch sensitive display comprising less than all of said touch sensitive display, a background image from a plurality of background images for respective categories of a plurality of categories of content components, according to a first type of input of said user, wherein said first type of input is said tactual type of input or said respiratory type of input;
        displaying within said first geometric region with said background image, an icon image from a plurality of icon images for respective content components from a plurality of content components of the category of content components corresponding to the displayed background image, according to a second type of input of said user, wherein said second type of input is said tactual type of input or said respiratory type of input and is different from said first type of input; and
        responsive to receipt of a predefined user action using said first type of input or said second type of input, performing a function associated with said displayed icon image and respective content component.

2. The method according to claim 1, wherein said device comprises a handheld device.

3. The method according to claim 2, wherein said handheld device comprises one or more of a mobile telephone, a mobile multimedia player, navigation device and/or a remote controller.

4. The method according to claim 1, wherein said detecting of said movement caused by said expulsion of said human breath occurs without use of a channel between said user and said MEMS sensing and processing module.

5. The method according to claim 1, wherein said detecting of said movement caused by said expulsion of said human breath is responsive to said human breath being exhaled into open space and onto one or more detectors in said MEMS sensing and processing module that enables said detection.

6. The method according to claim 1, comprising communicating said generated one or more control signals to said device via one or more of: an external memory interface, a universal asynchronous receiver transmitter (UART) interface, an enhanced serial peripheral interface (eSPI), a general purpose input/output (GPIO) interface, a pulse-code modulation (PCM) and/or an inter-IC sound ($I^2S$) interface, an inter-integrated circuit ($I^2C$) bus interface, a universal serial bus (USB) interface, a Bluetooth interface, a ZigBee interface, an IrDA interface, and/or a wireless USB (W-USB) interface.

7. The method according to claim 1, comprising navigating within said user interface via said generated one or more control signals.

8. The method according to claim 1, comprising enabling one or more of initiation, establishment and/or termination of communication by said device.

9. The method according to claim 1, comprising enabling interaction within said user interface of said device based on one or more of said expulsion of said human breath, tactual inputs, audio inputs, and/or movements of said device.

10. The method according to claim 1, wherein said user interface comprises the first geometric region having a first range of responsiveness to tactual input, and second geometric region separate from said first geometric region, said second geometric region having a second range of responsiveness to tactual input greater than said first range of responsiveness.

11. The method according to claim 10, wherein the second geometric region is configurable by the user to display results of performing the function associated with said displayed icon image.

12. The method according to claim 1, wherein performing the function associated with said displayed icon image comprises launching an application associated with said displayed icon image, wherein the association of the function with said displayed icon image is customizable by the user using a separate second device and transferred to become part of the graphical user interface of the device.

13. A non-transitory machine-readable storage medium having stored thereon, a computer program having at least one code section for interaction, the at least one code section being executable by a machine for causing the machine to perform steps comprising:
in a device comprising an embedded micro-electro-mechanical system (MEMS) sensing and processing module:
detecting movement of each of a plurality of independently movable segments of said MEMS sensing and processing module, said movement caused by flow of human breath expelled by a user upon said plurality of movable segments;
responsive to said detection, said MEMS sensing and processing module generating one or more control signals representative of a respiratory type of input from said user to control a graphical user interface of a touch sensitive display of said device;
receiving a tactual type of input resulting from contact of said user with said touch sensitive display;
displaying within a first geometric region of said touch sensitive display comprising less than all of said touch sensitive display, a background image from a plurality of background images for respective categories of a plurality of categories of content components, according to a first type of input of said user, wherein said first type of input is said tactual type of input or said respiratory type of input;
displaying within said first geometric region with said background image, an icon image from a plurality of icon images for respective content components from a plurality of content components of the category of content components corresponding to the displayed background image, according to a second type of input of said user, wherein said second type of input is said tactual type of input or said respiratory type of input and is different from said first type of input; and
responsive to receipt of a predefined user action using said first type of input or said second type of input, performing a function associated with said displayed icon image and respective content component.

14. The non-transitory machine-readable storage medium according to claim 13, wherein said device comprises a handheld device.

15. The non-transitory machine-readable storage medium according to claim 14, wherein said handheld device comprises one or more of a mobile telephone, a mobile multimedia player, navigation device and/or a remote controller.

16. The non-transitory machine-readable storage medium according to claim 13, wherein said detecting of said movement caused by said expulsion of said human breath occurs without use of a channel between said user and said MEMS sensing and processing module.

17. The non-transitory machine-readable storage medium according to claim 13, wherein said detecting of said movement caused by said expulsion of said human breath is responsive to said human breath being exhaled into open space and onto one or more detectors in said MEMS sensing and processing module that enables said detection.

18. The non-transitory machine-readable storage medium according to claim 13, wherein said at least one code section comprises code for communicating said generated one or more control signals to said device via one or more of: an external memory interface, a universal asynchronous receiver transmitter (UART) interface, an enhanced serial peripheral interface (eSPI), a general purpose input/output (GPIO) interface, a pulse-code modulation (PCM) and/or an inter-IC sound ($I^2S$) interface, an inter-integrated circuit ($I^2C$) bus interface, a universal serial bus (USB) interface, a Bluetooth interface, a ZigBee interface, an IrDA interface, and/or a wireless USB (W-USB) interface.

19. The non-transitory machine-readable storage medium according to claim 13, wherein said at least one code section comprises code for navigating within said user interface via said generated one or more control signals.

20. The non-transitory machine-readable storage medium according to claim 13, wherein said at least one code section comprises code for enabling one or more of initiation, establishment and/or termination of communication by said device.

21. The non-transitory machine-readable storage medium according to claim 13, wherein said at least one code section comprises code for enabling interaction within said user interface of said device based on one or more of said expulsion of said human breath, tactual inputs, audio inputs, and/or movements of said device.

22. The non-transitory machine-readable storage medium according to claim 13, wherein said user interface comprises the first geometric region having a first range of responsiveness to tactual input, and second geometric region separate from said first geometric region, said second geometric region having a second range of responsiveness to tactual input greater than said first range of responsiveness.

23. The non-transitory machine-readable storage medium according to claim 22, wherein the second geometric region is configurable by the user to display results of performing the function associated with said displayed icon image.

24. A system for interaction, the system comprising:
one or more processors and/or circuits for use in a device comprising an embedded micro-electro-mechanical system (MEMS) sensing and processing module, said one or more processors and/or circuits being operable to:
detect movement of each of a plurality of independently movable segments of said MEMS sensing and processing module, said movement caused by flow of human breath expelled by a user upon said plurality of movable segments;
responsive to said detection, said MEMS sensing and processing module generate one or more control signals representative of a respiratory type of input from said user to control a graphical user interface of a touch sensitive display of said device;
receive a tactual type of input resulting from contact of said user with said touch sensitive display;
display within a first geometric region of said touch sensitive display comprising less than all of said touch sensitive display, a background image from a plurality of background images for respective categories of a plurality of categories of content components, according to a first type of input of said user, wherein said first type of input is said tactual type of input or said respiratory type of input;
display within said first geometric region with said background image, an icon image from a plurality of icon images for respective content components from a plurality of content components of the category of content components corresponding to the displayed background image, according to a second type of input of said user, wherein said second type of input is said tactual type of input or said respiratory type of input and is different from said first type of input; and responsive to receipt of a predefined user action using said first type of input or said second type of input, perform a function associated with said displayed icon image and respective content component.

25. The system according to claim 24, wherein said device comprises a handheld device.

26. The system according to claim 25, wherein said handheld device comprises one or more of a mobile telephone, a mobile multimedia player, navigation device and/or a remote controller.

27. The system according to claim 24, wherein said detecting of said movement caused by said expulsion of said human breath occurs without use of a channel between said user and said MEMS sensing and processing module.

28. The system according to claim 24, wherein said detecting of said movement caused by said expulsion of said human breath is responsive to said human breath being exhaled into open space and onto one or more detectors in said MEMS sensing and processing module that enables said detection.

29. The system according to claim 24, wherein said one or more processors and/or circuits are operable to communicate said generated one or more control signals to said device via one or more of: an external memory interface, a universal asynchronous receiver transmitter (UART) interface, an enhanced serial peripheral interface (eSPI), a general purpose input/output (GPIO) interface, a pulse-code modulation (PCM) and/or an inter-IC sound ($I^2S$) interface, an inter-integrated circuit ($I^2C$) bus interface, a universal serial bus (USB) interface, a Bluetooth interface, a ZigBee interface, an IrDA interface, and/or a wireless USB (W-USB) interface.

30. The system according to claim 24, wherein said one or more processors and/or circuits are operable to navigate within said user interface via said generated one or more control signals.

31. The system according to claim 24, wherein said one or more processors and/or circuits are operable to enable one or more of initiation, establishment and/or termination of communication by said device.

32. The system according to claim 24, wherein said one or more processors and/or circuits are operable to enable interaction within said user interface of said device based on one or more of said expulsion of said human breath, tactual inputs, audio inputs, and/or movements of said device.

33. The system according to claim 24, wherein said user interface comprises the first geometric region having a first range of responsiveness to tactual input, and second geometric region separate from said first geometric region, said second geometric region having a second range of responsiveness to tactual input greater than said first range of responsiveness.

34. The system according to claim 33, wherein the second geometric region is configurable by the user to display results of performing the function associated with said displayed icon image.

* * * * *